(12) United States Patent
Ganguli et al.

(10) Patent No.: US 11,467,873 B2
(45) Date of Patent: Oct. 11, 2022

(54) TECHNOLOGIES FOR RDMA QUEUE PAIR QOS MANAGEMENT

(71) Applicant: Intel Corporation, Santa Clara, CA (US)

(72) Inventors: Mrittika Ganguli, Tempe, AZ (US); Neerav Parikh, Hillsboro, OR (US); Robert Sharp, Austin, TX (US); Sujoy Sen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 16/524,448

(22) Filed: Jul. 29, 2019

(65) Prior Publication Data

US 2019/0354406 A1 Nov. 21, 2019

(51) Int. Cl.
*G06F 9/50* (2006.01)
*G06F 9/455* (2018.01)
*G06F 15/173* (2006.01)

(52) U.S. Cl.
CPC ........ *G06F 9/5011* (2013.01); *G06F 9/45558* (2013.01); *G06F 15/17331* (2013.01); *G06F 2009/45562* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 7,522,620 | B2* | 4/2009 | Wishneusky | H04L 47/527 370/412 |
| 7,676,597 | B2 | 3/2010 | Kagan et al. | |
| 7,797,699 | B2* | 9/2010 | Kagi | G06F 9/5011 718/1 |
| 7,870,268 | B2* | 1/2011 | Beverly | H04L 69/163 709/228 |
| 7,987,469 | B2* | 7/2011 | Magro | G06F 9/45533 719/314 |
| 8,677,031 | B2* | 3/2014 | Tamir | H04L 67/1097 710/22 |
| 9,354,933 | B2* | 5/2016 | Sharp | G06F 3/0619 |
| 2016/0212214 | A1 | 7/2016 | Rahman et al. | |
| 2017/0149920 | A1 | 5/2017 | Sammatshetti | |

(Continued)

OTHER PUBLICATIONS

Lai et al. "Advanced RDMA-based Admission Control for Modern Data-Centers", 2008 IEEE, pp. 384-391.*

(Continued)

*Primary Examiner* — Van H Nguyen
(74) *Attorney, Agent, or Firm* — Compass IP Law PC

(57) ABSTRACT

Technologies for remote direct memory access (RDMA) queue pair quality of service (QoS) management are disclosed. In the illustrative embodiment, several queue pairs associated with a virtual machine on a compute sled may be created in a network interface controller of the compute sled. A QoS parameter such as a class of service identifier or a weighting may be assigned to each queue pair such that each queue pair has a different available bandwidth. The compute sled may also predict future RDMA queue pair bandwidth usage and adjust RDMA queue pair bandwidth allocation based on the prediction.

19 Claims, 20 Drawing Sheets

(56) References Cited

U.S. PATENT DOCUMENTS

2018/0088978 A1 3/2018 Li et al.

OTHER PUBLICATIONS

Mouzakitis et al. "Lightweight and Generic RDMA Engine Para-Virtualization for the KVM Hypervisor", 2017 IEEE, pp. 737-744.*
Gerofi et al. "RDMA based Replication of Multiprocessor Virtual Machines over High-Performance Interconnects", 2011 IEEE, pp. 35-44.*
Zhang et al. "Performance Isolation Anomalies in RDMA", 2017 ACM, pp. 43-48.*
Patel et al. "OBM—An Optimal Bandwidth Management Strategy to Virtual Machines in Cloud Environment using Predictive Analytics", 2013 IEEE, 6 pages.*
Zeng et al. "Periodic Bandwidth Allocation Based on Virtual Queue Occupancy", 2002 IEEE, 5 pages.*
Extended European Search Report for Patent Application No. 20165698.0, dated Oct. 21, 2020, 12 pages.

* cited by examiner

TECHNOLOGIES FOR RDMA QUEUE PAIR QOS MANAGEMENT

BACKGROUND

Remote direct memory access (RDMA) in a data center environment allows for high-throughput, low-latency network communications. Using RDMA, a source node is able to write to target node without requiring the target node to use any processor or cache resources and without requiring context switching in the processor of the target node. Implementations such as RDMA over converged Ethernet (RoCE) can allow RDMA to operate efficiently over a layer 2 network such as Ethernet, although careful control of network traffic may be necessary to reduce or eliminate congestion.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
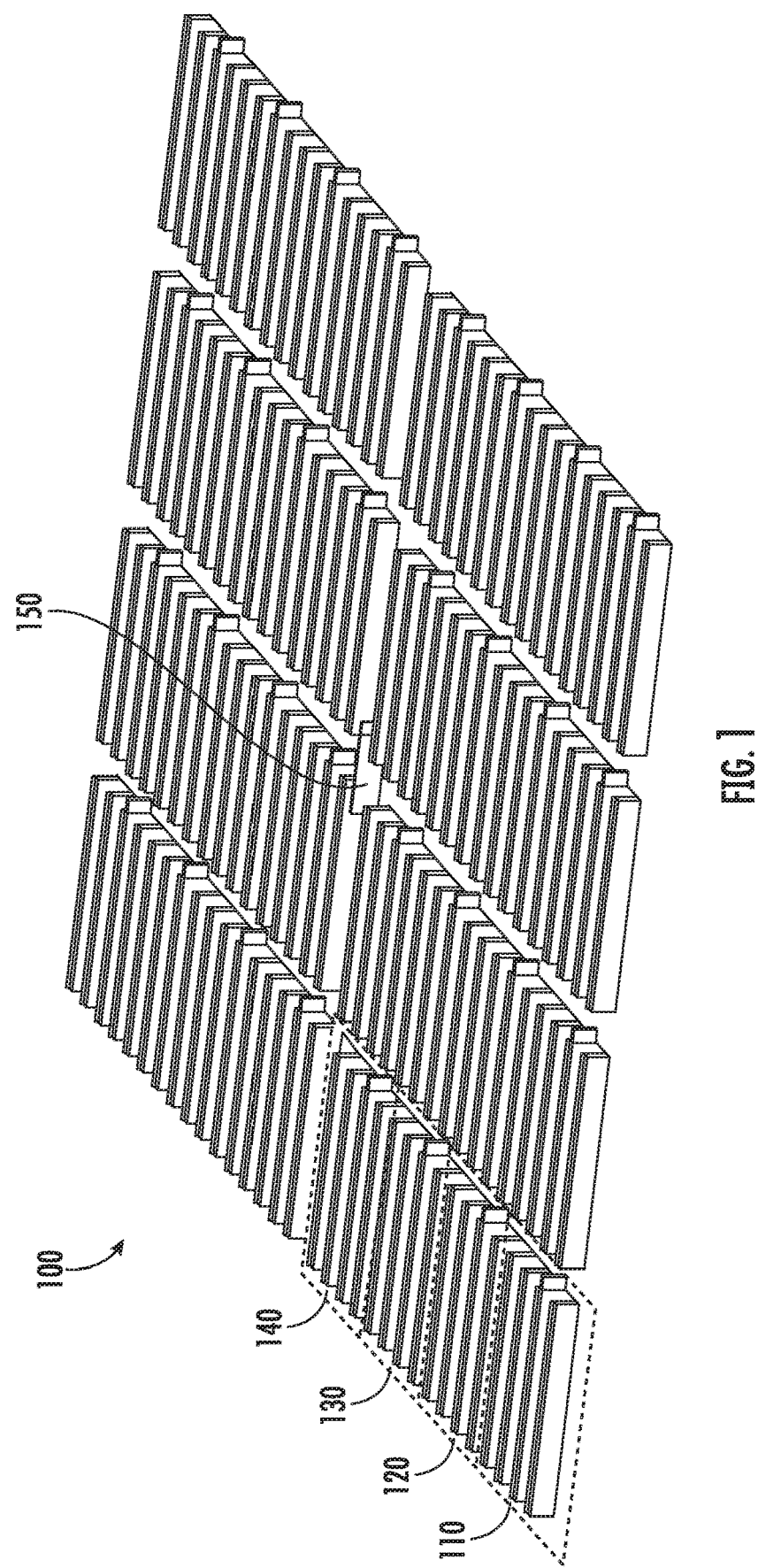
FIG. 1 is a simplified diagram of at least one embodiment of a data center for executing workloads with dis aggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or nonvolatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
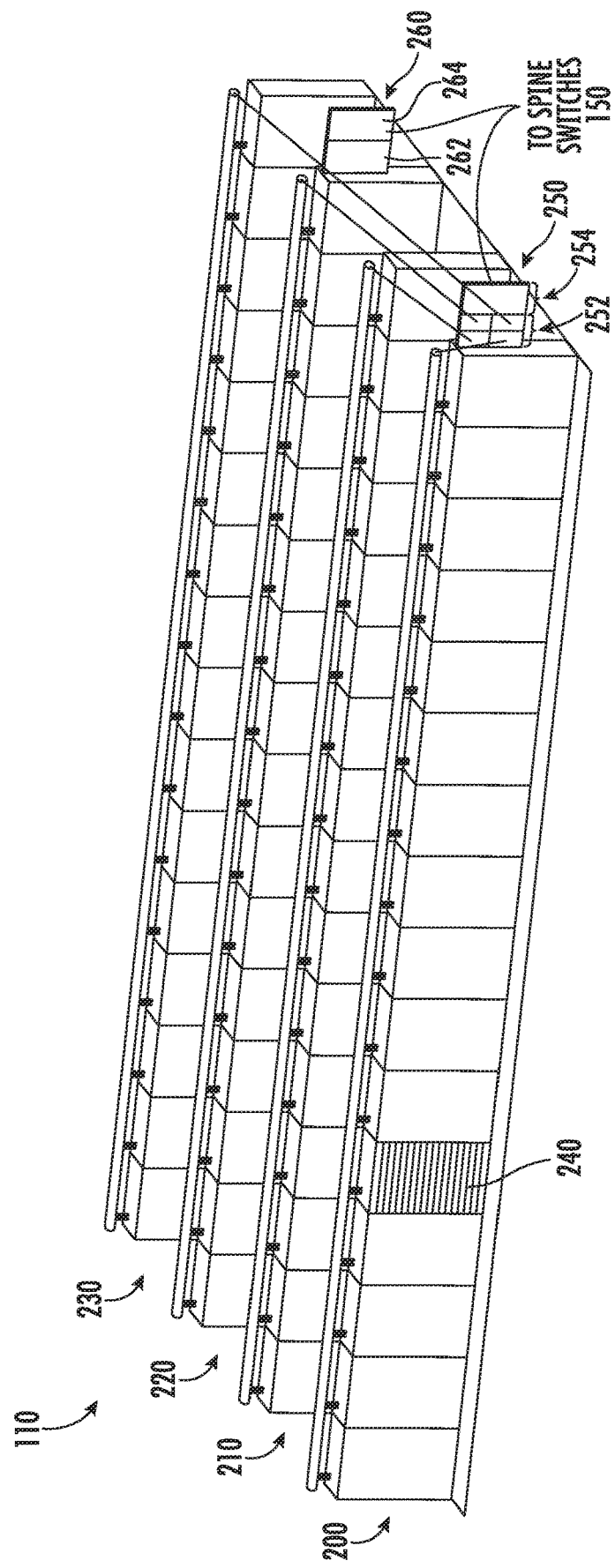
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
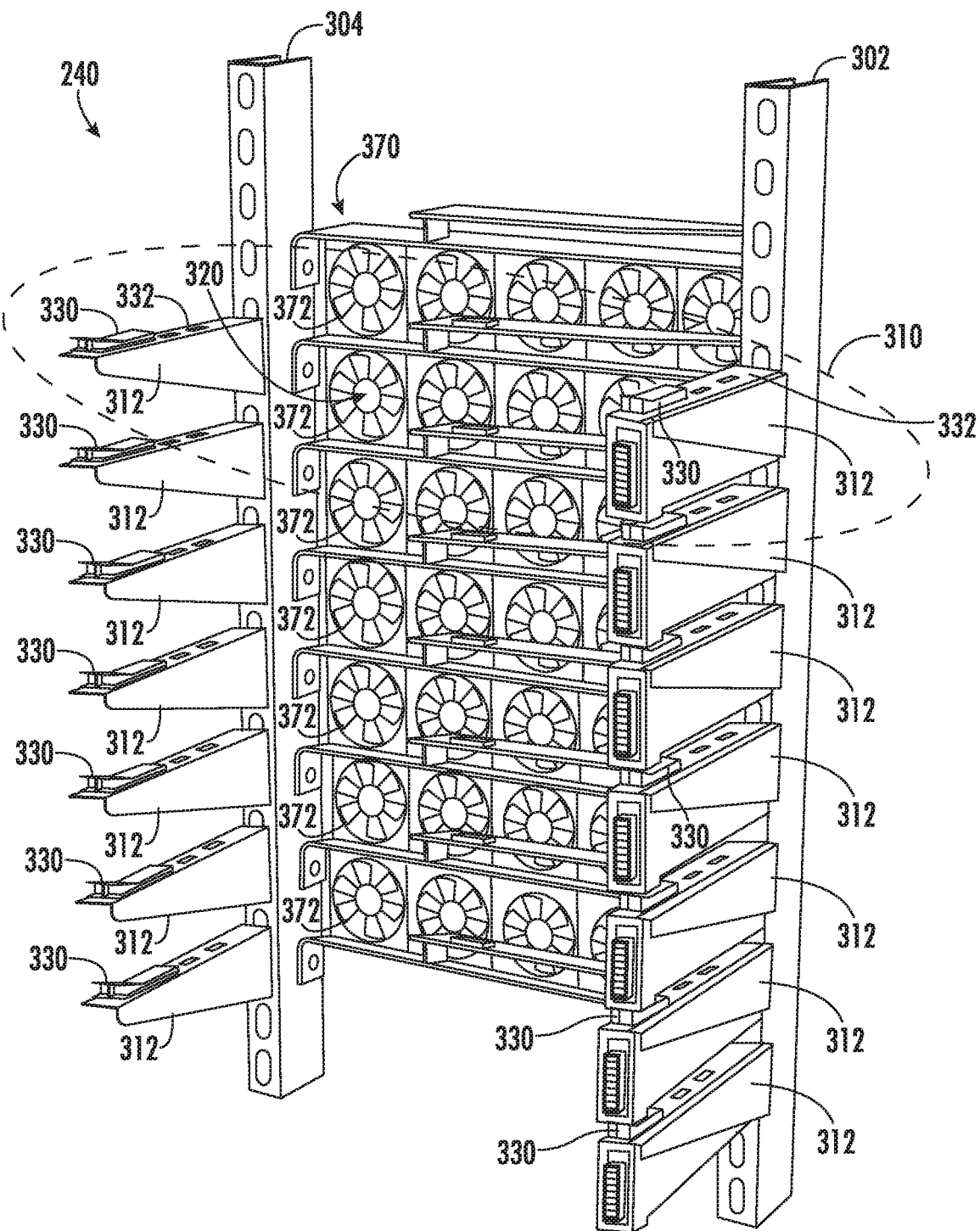
FIG. 3 is a perspective view of at least one embodiment of a rack that may be included in the pod of FIG. 2.
Figure 4:
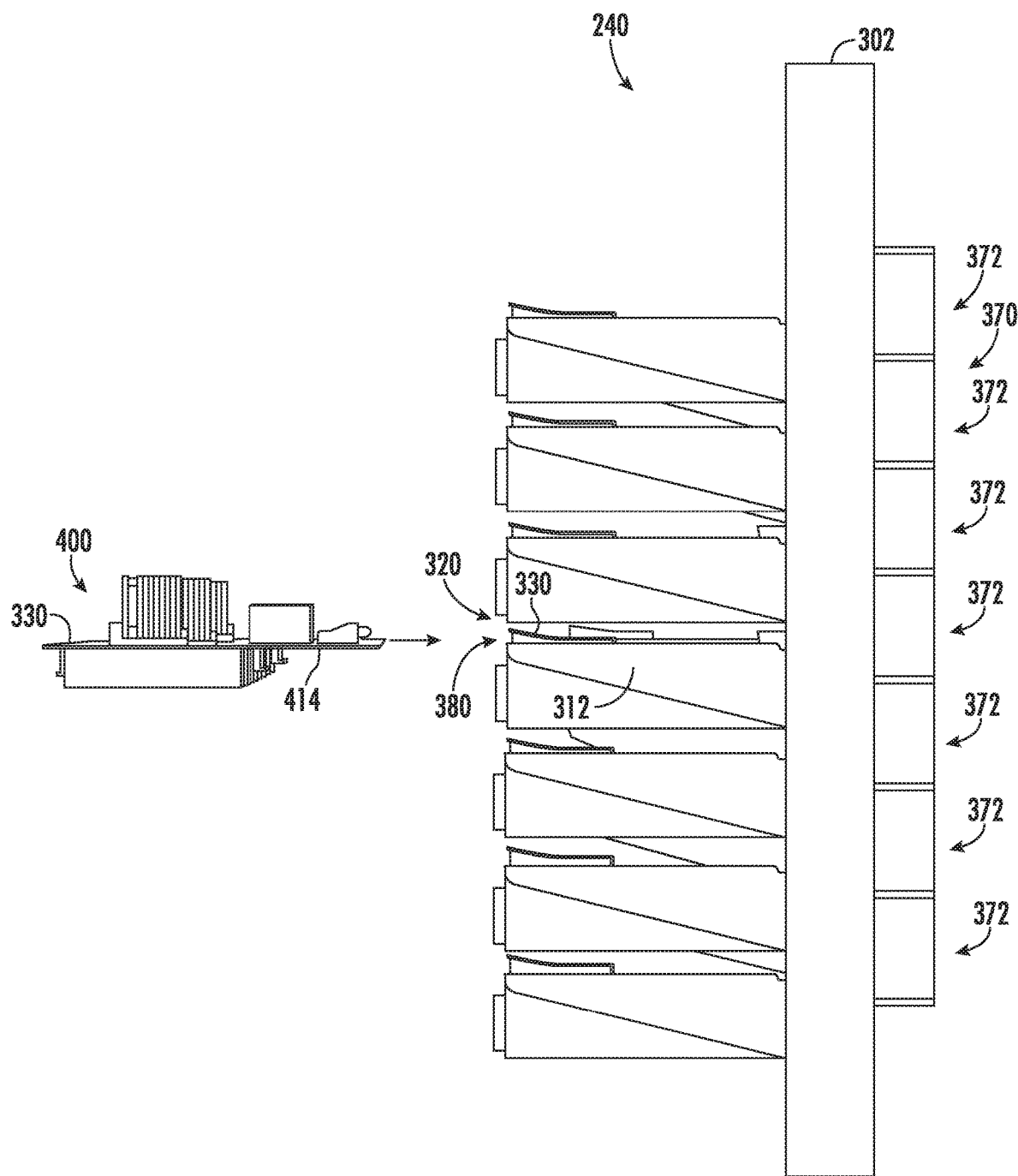
FIG. 4 is a side elevation view of the rack of FIG. 3.
Figure 5:
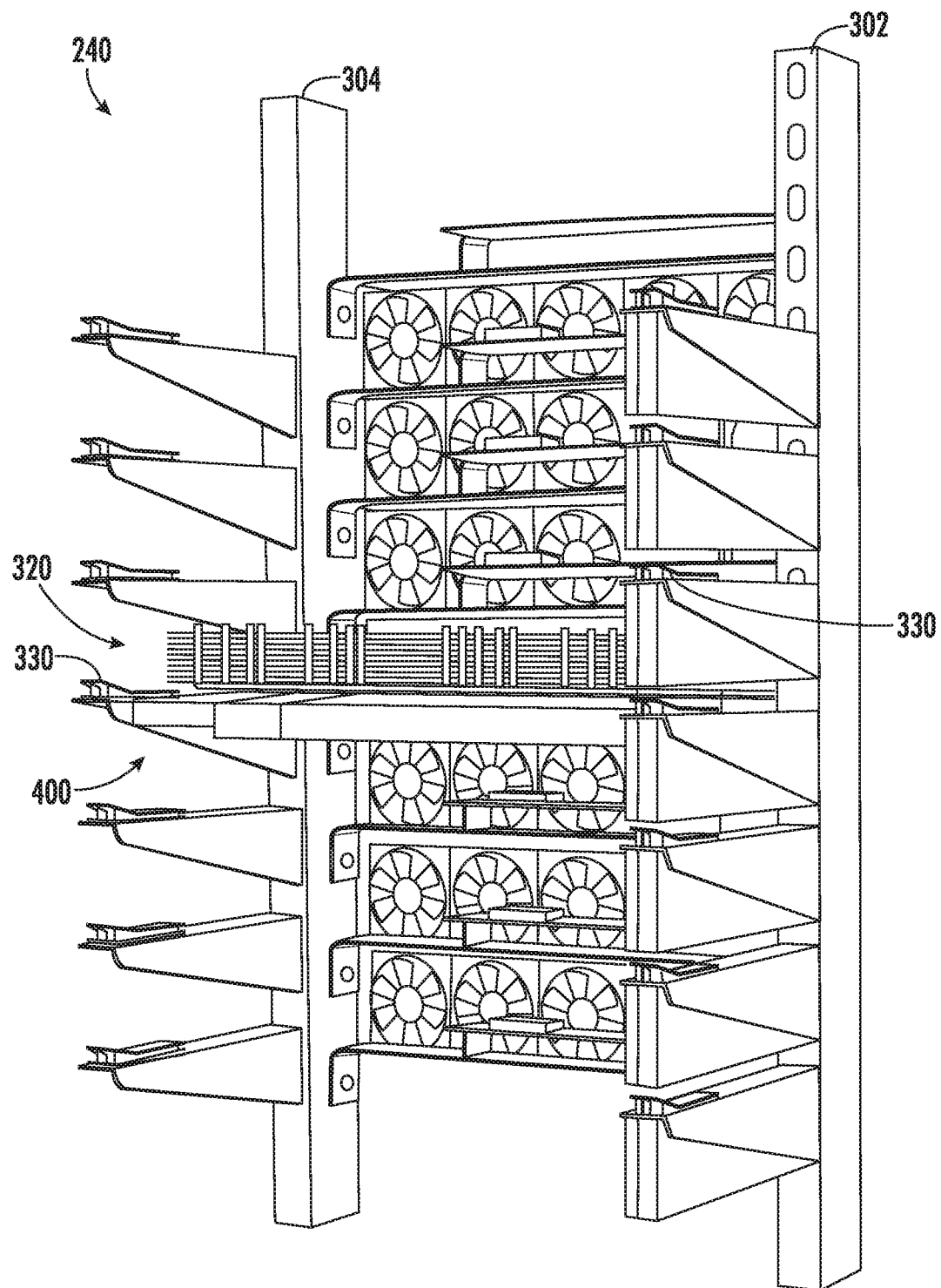
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassisless sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
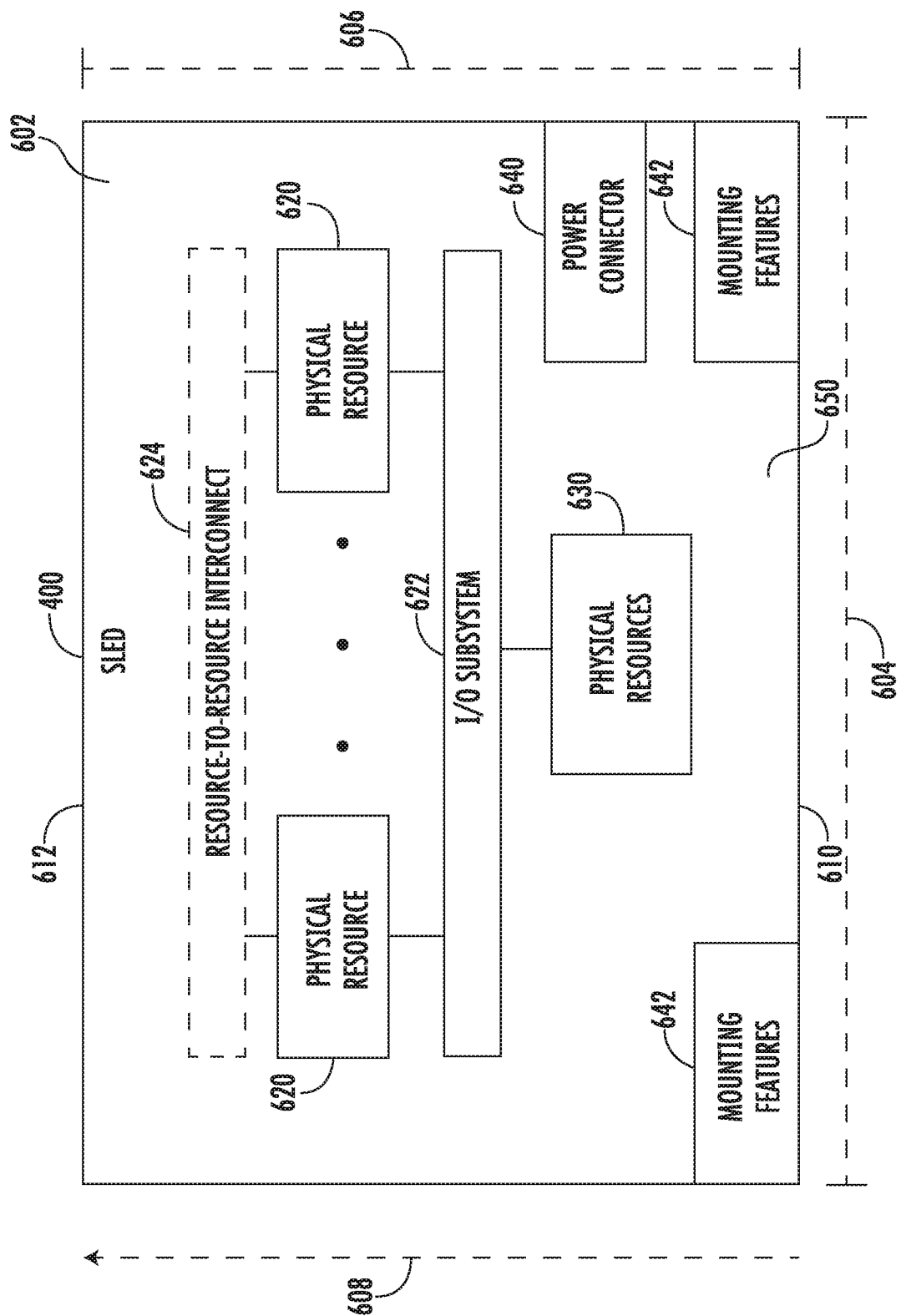
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus, as described further below.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
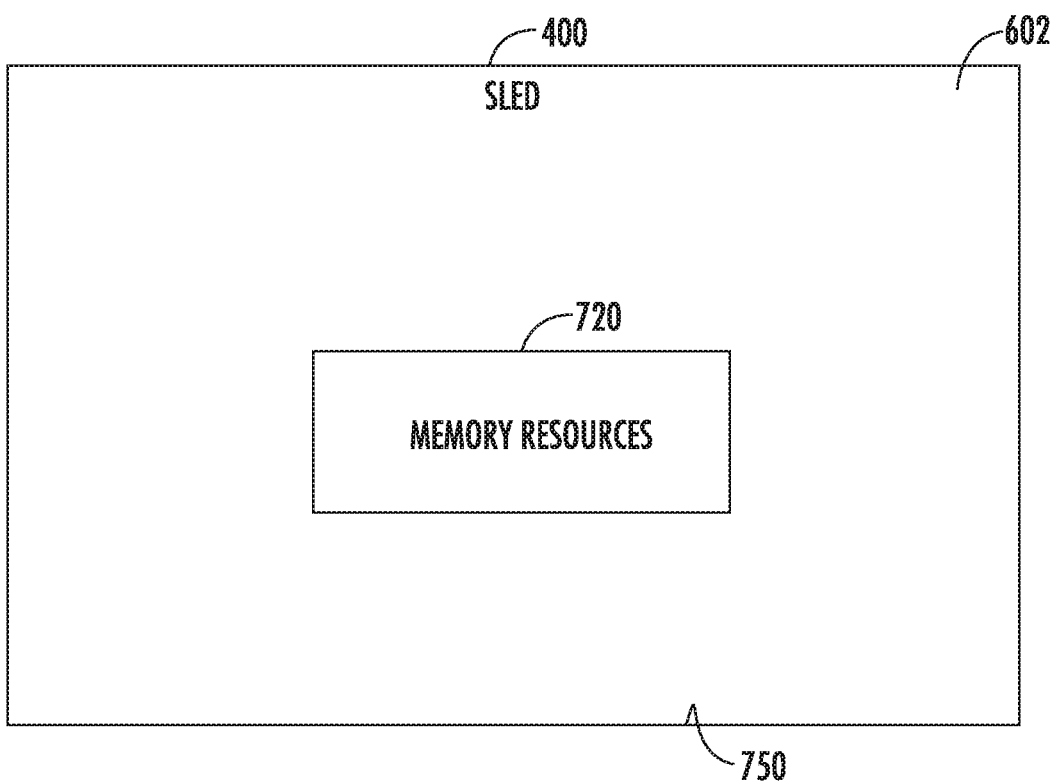
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or nonvolatile memory. Volatile memory may be a memory that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by the Joint Electronic Device Engineering Council (JEDEC), such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the memory devices that implement such standards may be referred to as DDR-based interfaces.

In one embodiment, the memory device is a block addressable memory device, such as those based on NAND or NOR technologies, such as multi-threshold level NAND flash memory or NOR flash memory. A memory device may also include byte addressable write-in-place nonvolatile memory devices, such as Intel 3D XPoint™ memory, Intel Optane™ memory, Micron QuantX™ memory, magnetoresistive random access memory (MRAM) memory that incorporates memristor technology, or other byte addressable write-in-place nonvolatile memory devices. In some embodiments, the memory device may comprise a transistor-less stackable cross point architecture in which memory cells sit at the intersection of word lines and bit lines and are individually addressable and in which bit storage is based on a change in bulk resistance. In one embodiment, the memory device may be or may include memory devices that use chalcogenide glass, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

Figure 8:
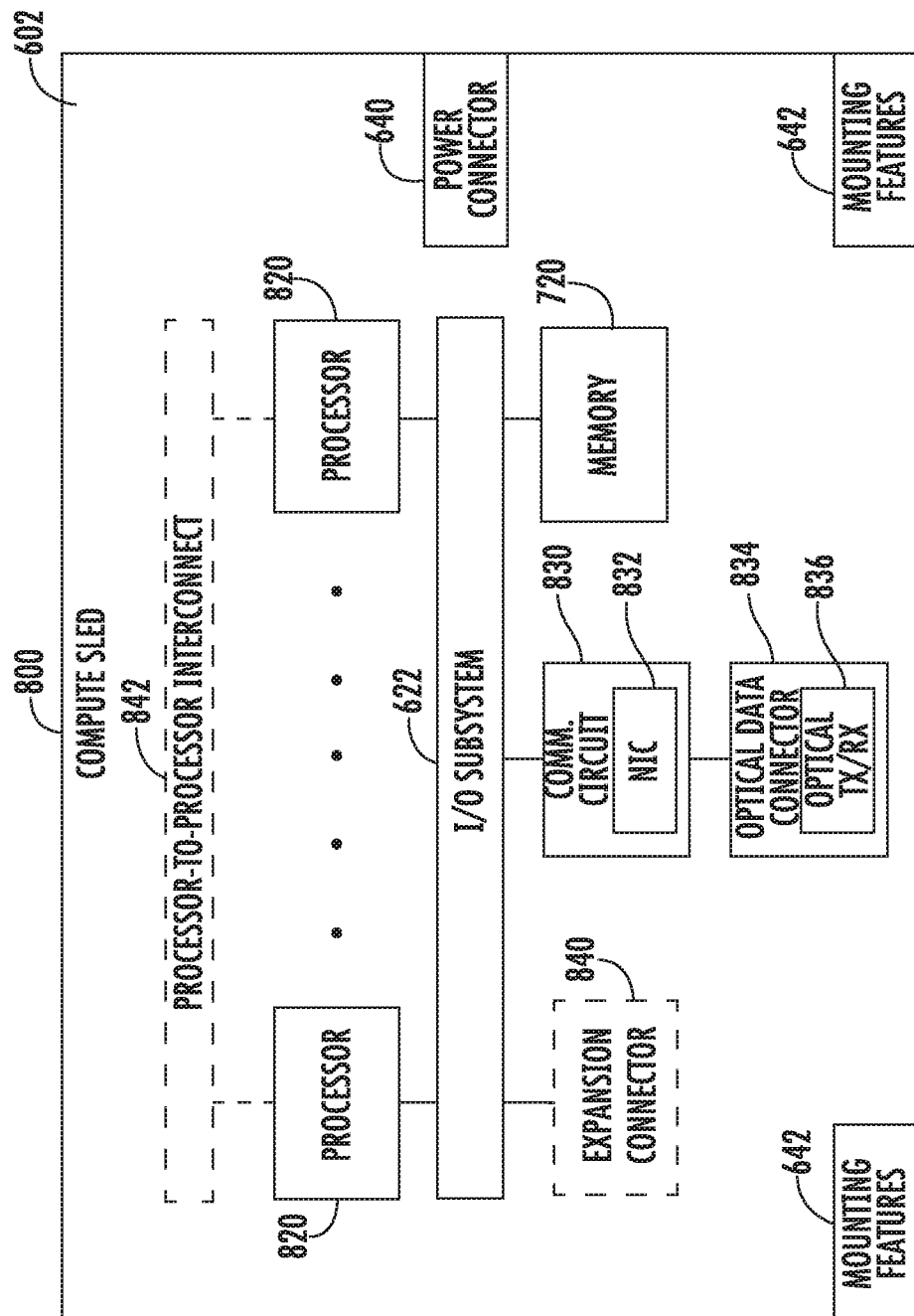
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
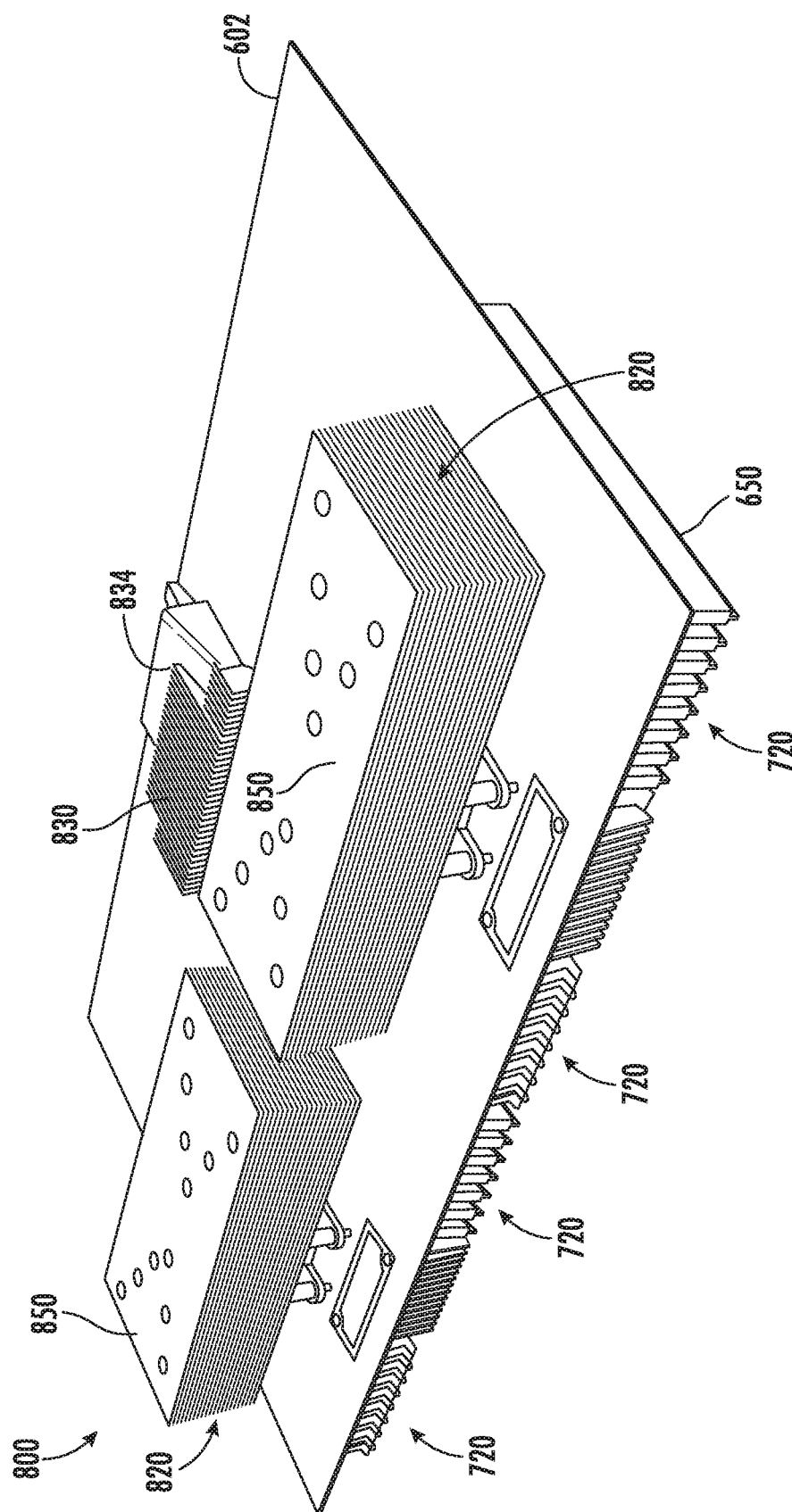
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heat sink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heat sinks 850 having a larger size relative to traditional heat sinks used in typical servers. Additionally, due to the improved thermal cooling characteristics of the chassis-less circuit board substrate 602, none of the processor heat sinks 850 include cooling fans attached thereto. That is, each of the heat sinks 850 is embodied as a fan-less heat sink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
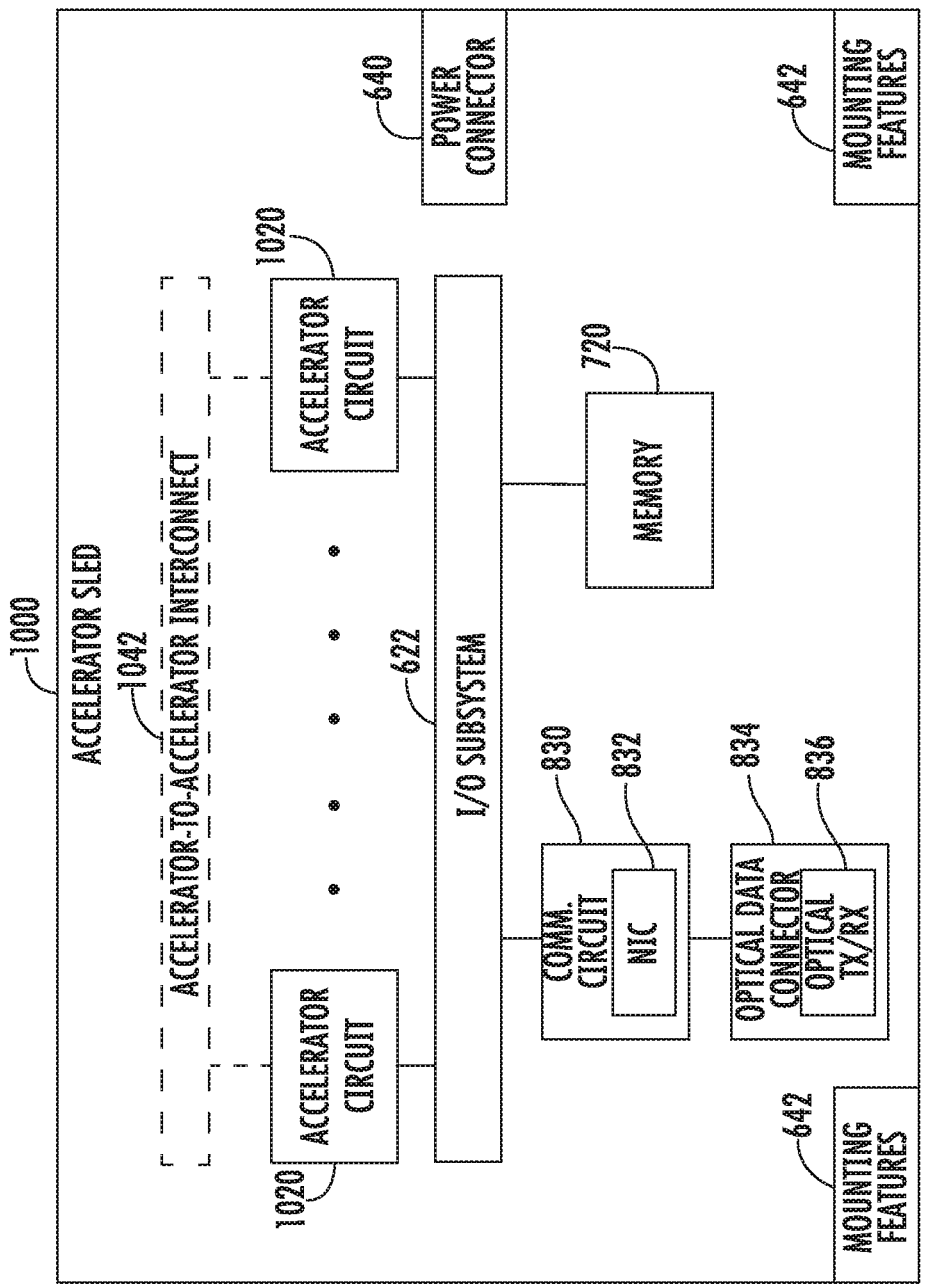
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
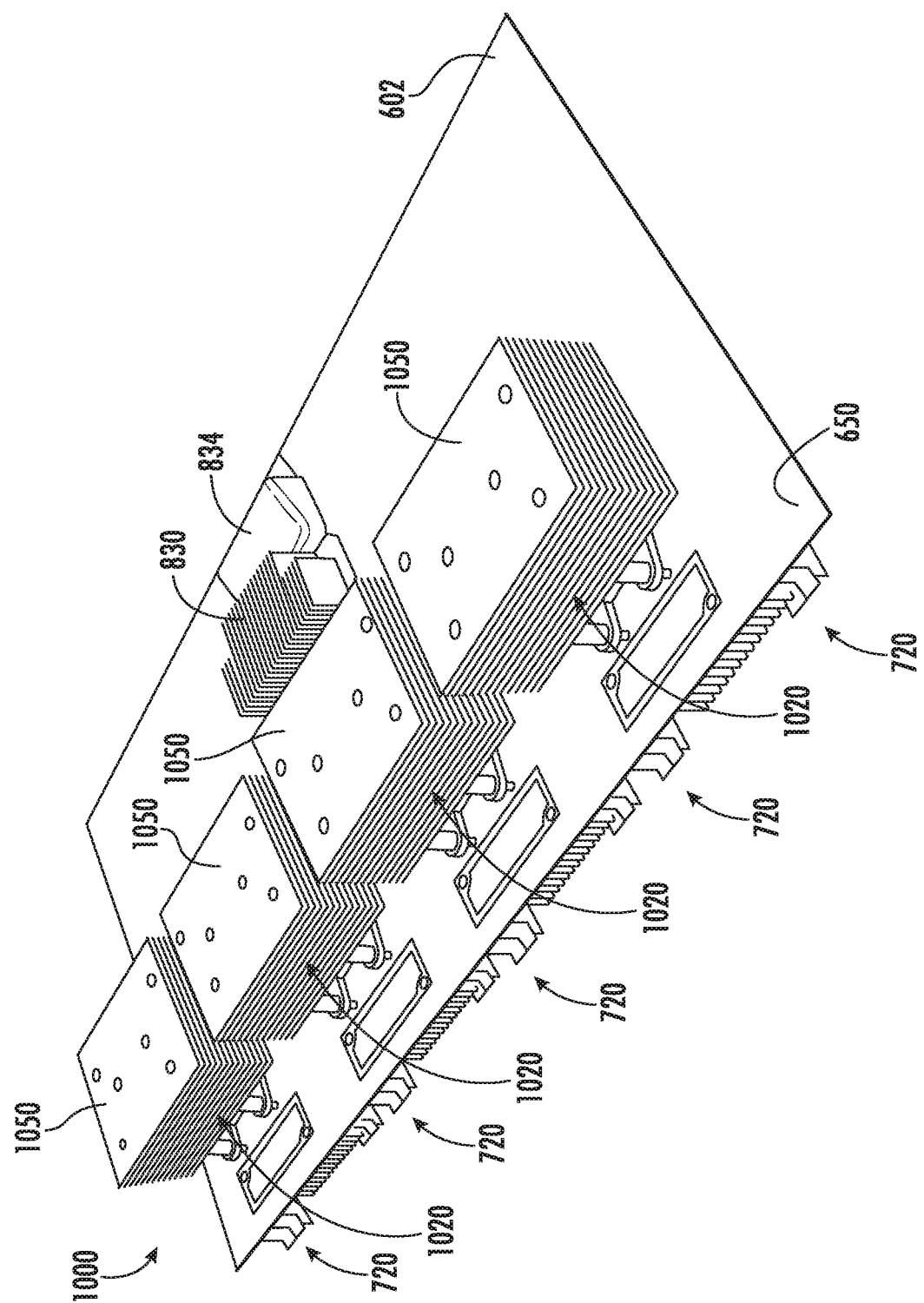
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heat sink 1070 that is larger than a traditional heat sink used in a server. As discussed above with reference to the heat sinks 870, the heat sinks 1070 may be larger than traditional heat sinks because of the "free" area provided by the memory resources 720 being located on the bottom side 750 of the chassis-less circuit board substrate 602 rather than on the top side 650.

Figure 12:
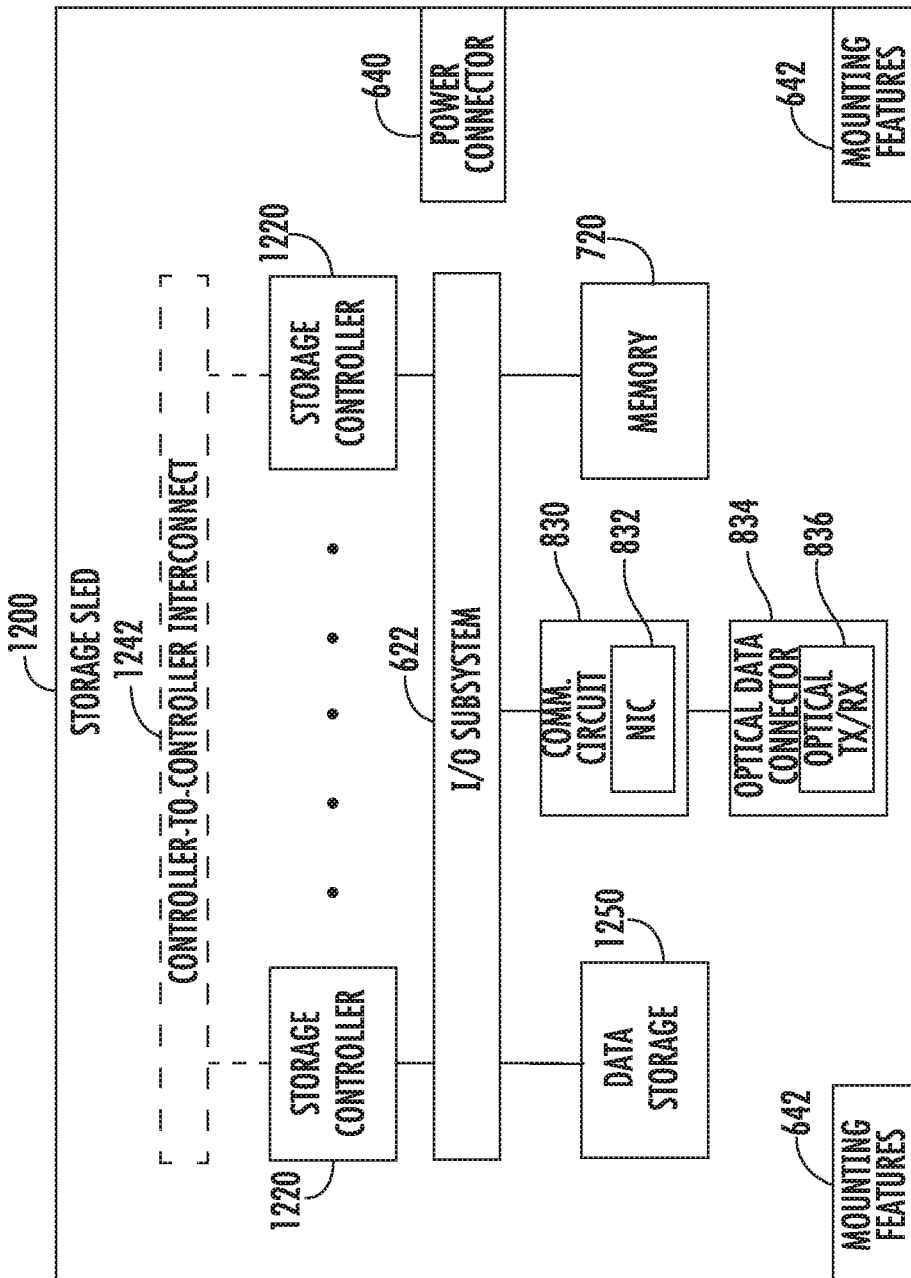
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
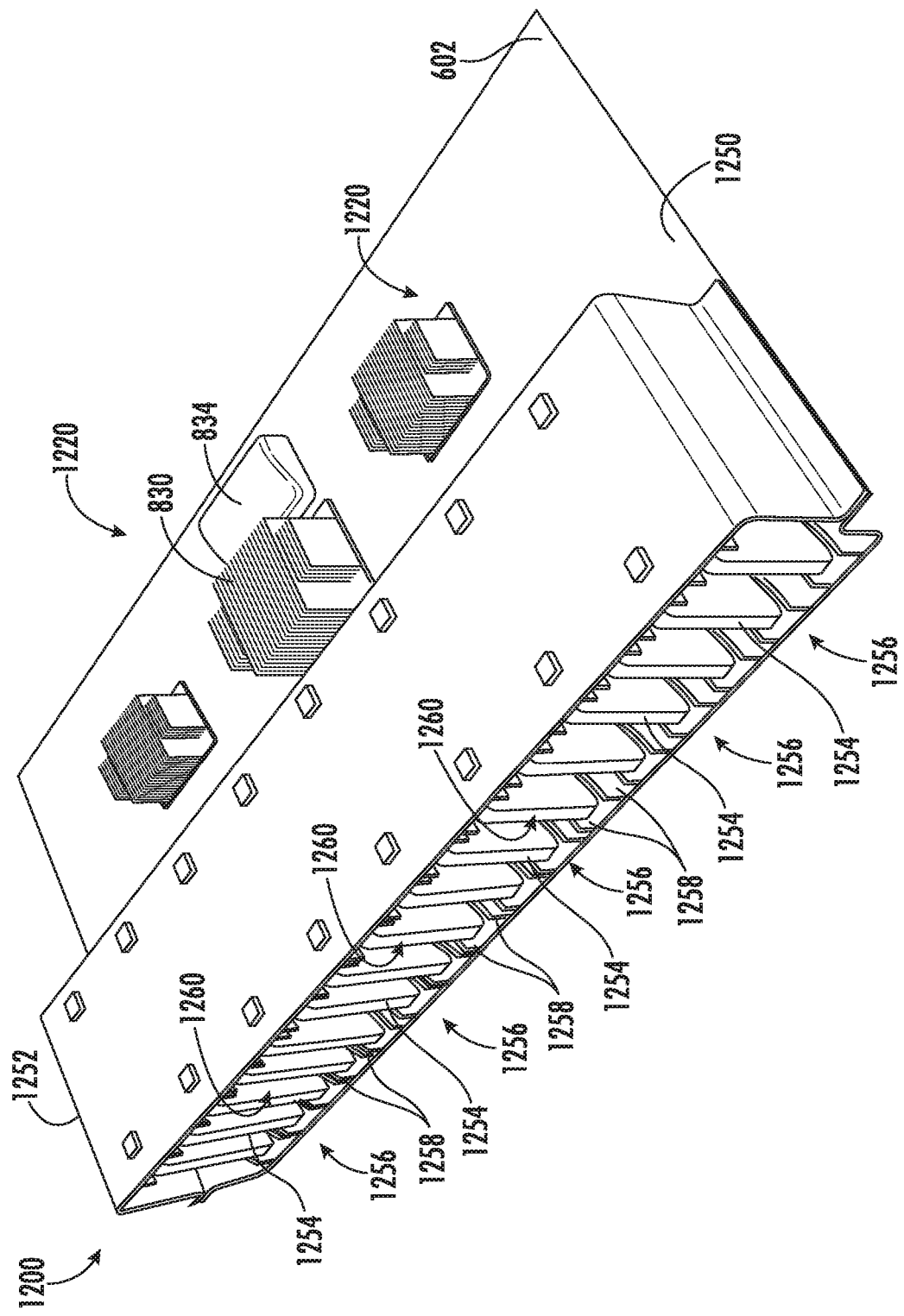
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and nonvolatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heat sink 1270 secured thereto. As discussed above, due to the improved thermal cooling characteristics of the chassis-less circuit board substrate 602 of the storage sled 1200, none of the heat sinks 1270 include cooling fans attached thereto. That is, each of the heat sinks 1270 is embodied as a fan-less heat sink.

Figure 14:
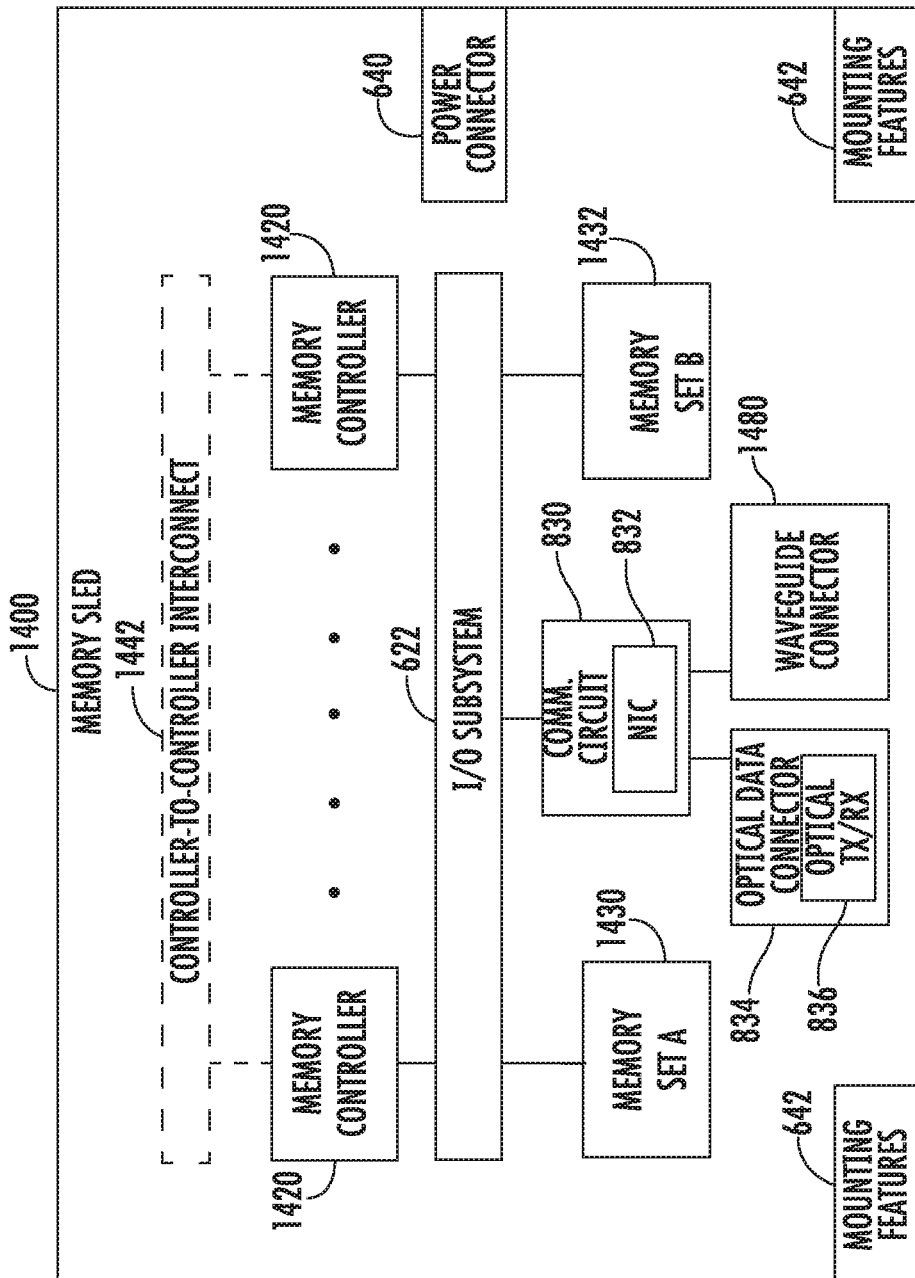
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
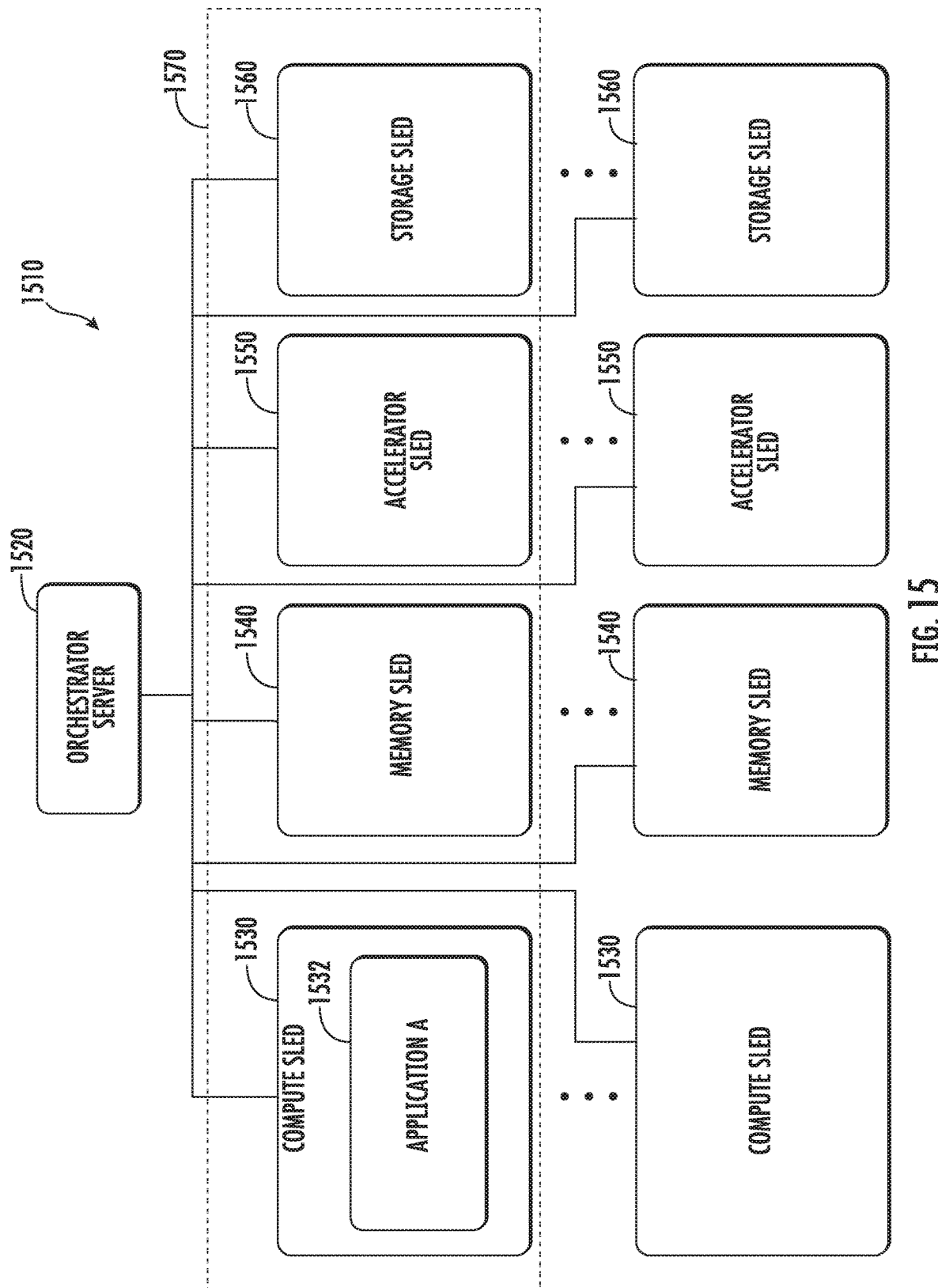
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
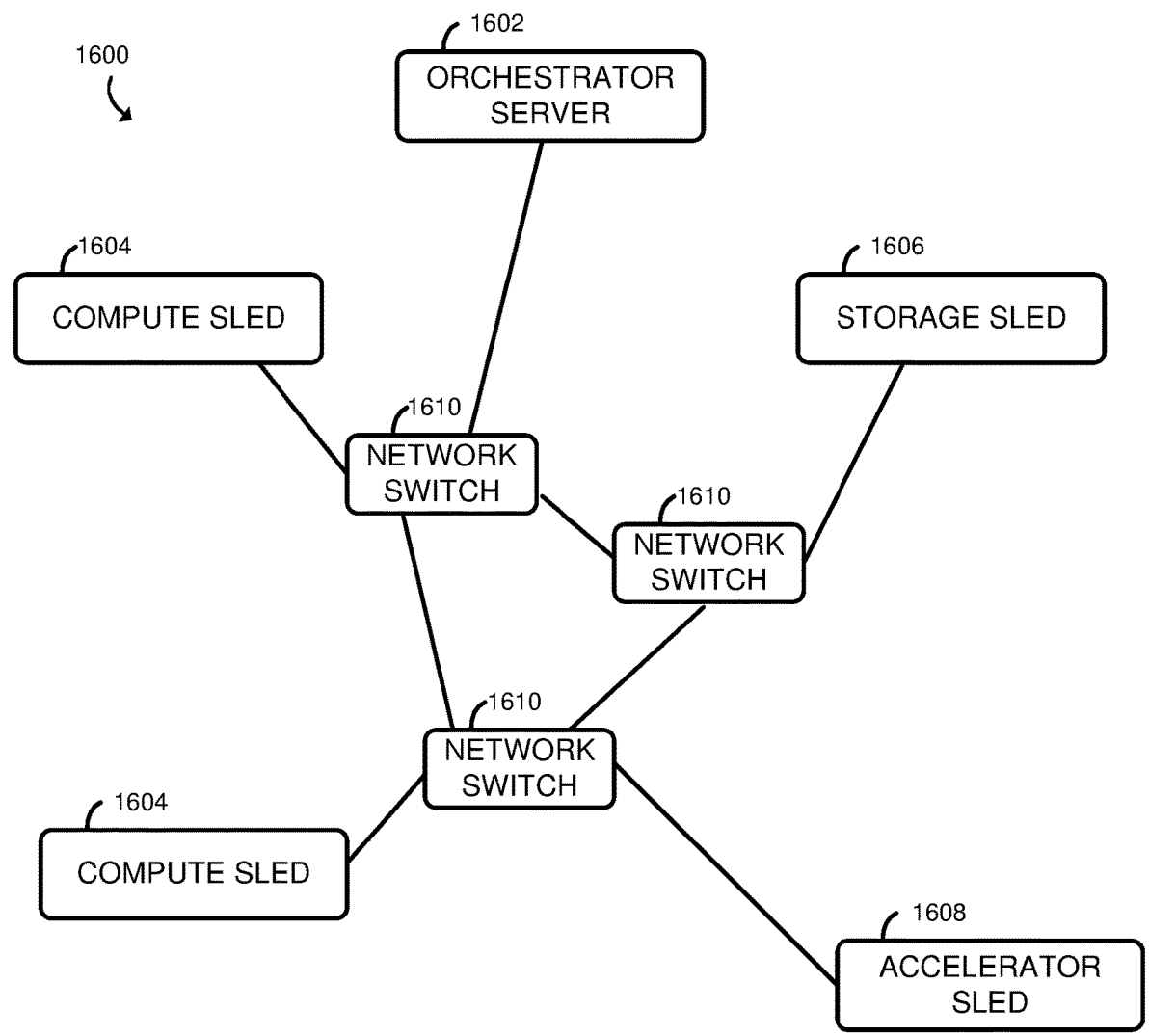
FIG. 16 is a simplified block diagram of a system for managing RDMA queue pair QoS.

Referring now to FIG. 16, an illustrative system 1600 for remote direct memory access (RDMA) queue pair quality-of-service (QoS) management include an orchestrator server 1602, one or more compute sleds 1604, one or more storage sleds 1606, one or more accelerator sleds 1608, and one or more network switches 1610. In use, RDMA queue pairs of a send queue and a receive queue may be established as part of an RDMA protocol between various nodes, such as between two compute sleds 1604, between a compute sled 1604 and a storage sled 1606, between a compute sled 1604 and an accelerator sled 1608, etc. The RDMA queue pairs on the compute sled 1604 may be associated with a virtual machine. Each RDMA queue pair of the virtual machine may have a different QoS parameter, such as a different class of service parameter, a different weight, etc., such that each RDMA queue pair of the virtual machine may, e.g., be allocated a different amount of bandwidth. For example, a first RDMA queue pair of a virtual machine that is associated with an RDMA queue pair on a remote compute sled 1604 may have a first QoS parameter, a second RDMA queue pair of a virtual machine that is associated with an RDMA queue pair on a remote storage sled 1606 may have a second QoS parameter, and a third RDMA queue pair of a virtual machine that is associated with an RDMA queue pair on a remote accelerator sled 1608 may have a third QoS parameter, wherein the first, second, and third QoS parameters can all be different from each other. In some embodiments, the compute sled 1604 and/or orchestrator server 1602 may analyze RDMA flows and predict future bandwidth usage of RDMA queue pairs. The compute sled 1604 may adjust the bandwidth assigned to each RDMA queue pair based on the predicted future bandwidth usage.

Figure 17:
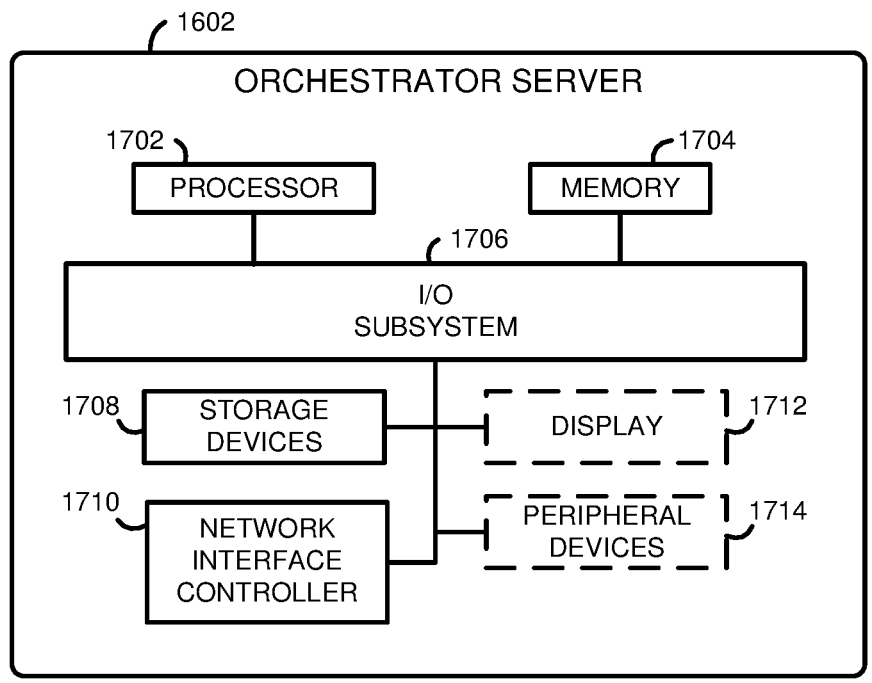
FIG. 17 is a simplified block diagram of an orchestrator server of the system in FIG. 16.

Referring now to FIG. 17, the orchestrator server 1602 may be embodied as any type of compute device capable of performing the orchestration functions described herein. For example, the orchestrator server 1602 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. In some embodiments, the orchestrator server 1602 may be composed of or otherwise include two or more disaggregated components, such as one or more compute sleds 1604, one or more storage sleds 1606, and/or one or more network switches 1610. The illustrative orchestrator server 1602 includes a processor 1702, a memory 1704, an input/output (I/O) subsystem 1706, one or more storage devices 1708, and a network interface controller 1710. In some embodiments, one or more of the illustrative components of the orchestrator server 1602 may be incorporated in, or otherwise form a portion of, another component. For example, the memory 1704, or portions thereof, may be incorporated in the processor 1702 in some embodiments.

The processor 1702 may be embodied as any type of processor capable of performing the functions described herein. For example, the processor 1702 may be embodied as a single or multi-core processor(s), a single or multi-socket processor, a digital signal processor, a graphics processor, a microcontroller, or other processor or processing/controlling circuit. Similarly, the memory 1704 may be embodied as any type of volatile or non-volatile memory or data storage capable of performing the functions described herein. In operation, the memory 1704 may store various data and software used during operation of the orchestrator server 1602 such as operating systems, applications, programs, libraries, and drivers. The memory 1704 is communicatively coupled to the processor 1702 via the I/O subsystem 1706, which may be embodied as circuitry and/or components to facilitate input/output operations with the processor 1702, the memory 1704, and other components of the orchestrator server 1602. For example, the I/O subsystem 1706 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1706 may form a portion of a system-on-a-chip (SoC) and be incorporated, along with the processor 1702, the memory 1704, and other components of the orchestrator server 1602 on a single integrated circuit chip.

The one or more storage devices 1708 may be embodied as any type of device or devices configured for the short-term or long-term storage of data. For example, the one or more storage devices 1708 may include any one or more memory devices and circuits, memory cards, hard disk drives, solid-state drives, or other data storage devices.

The network interface controller 1710 may be embodied as any type of interface capable of interfacing the orchestrator server 1602 with other compute devices, such as through the one or more network switches 1610. In some embodiments, the network interface controller 1710 may be referred to as a host fabric interface (HFI). The network interface controller 1710 may be capable of interfacing with any appropriate cable type, such as an electrical cable or an optical cable, and/or may be capable of interfacing with a wireless signal, such as through one or more antennae. The network interface controller 1710 may be configured to use any one or more communication technology and associated protocols (e.g., Ethernet, Bluetooth®, WiMAX, near field communication (NFC), etc.). The network interface controller 1710 may be located on silicon separate from the processor 1702, or the network interface controller 1710 may be included in a multi-chip package with the processor 1702, or even on the same die as the processor 1702. The network interface controller 1710 may be embodied as one or more add-in-boards, daughtercards, network interface cards, controller chips, chipsets, specialized components such as a field programmable gate array (FPGA) or application specific integrated circuit (ASIC), or other devices that may be used by the orchestrator server 1602 to connect with another compute device. In some embodiments, network interface controller 1710 may be embodied as part of a system-on-a-chip (SoC) that includes one or more processors, or included on a multichip package that also contains one or more processors. In some embodiments, the network interface controller 1710 may include a local processor (not shown) and/or a local memory (not shown) that are both local to the network interface controller 1710. In such embodiments, the local processor of the network interface controller 1710 may be capable of performing one or more of the functions of the processor 1702 described herein. Additionally or alternatively, in such embodiments, the local memory of the network interface controller 1710 may be integrated into one or more components of the orchestrator server 1602 at the board level, socket level, chip level, and/or other levels.

In some embodiments, the orchestrator server 1602 may include other or additional components, such as those commonly found in a compute device. For example, the orchestrator server 1602 may also have a display 1712 and/or peripheral devices 1714. The peripheral devices 1714 may include a keyboard, a mouse, etc. The display 1712 may be embodied as any type of display on which information may be displayed to a user of the orchestrator server 1602, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology.

Figure 18:
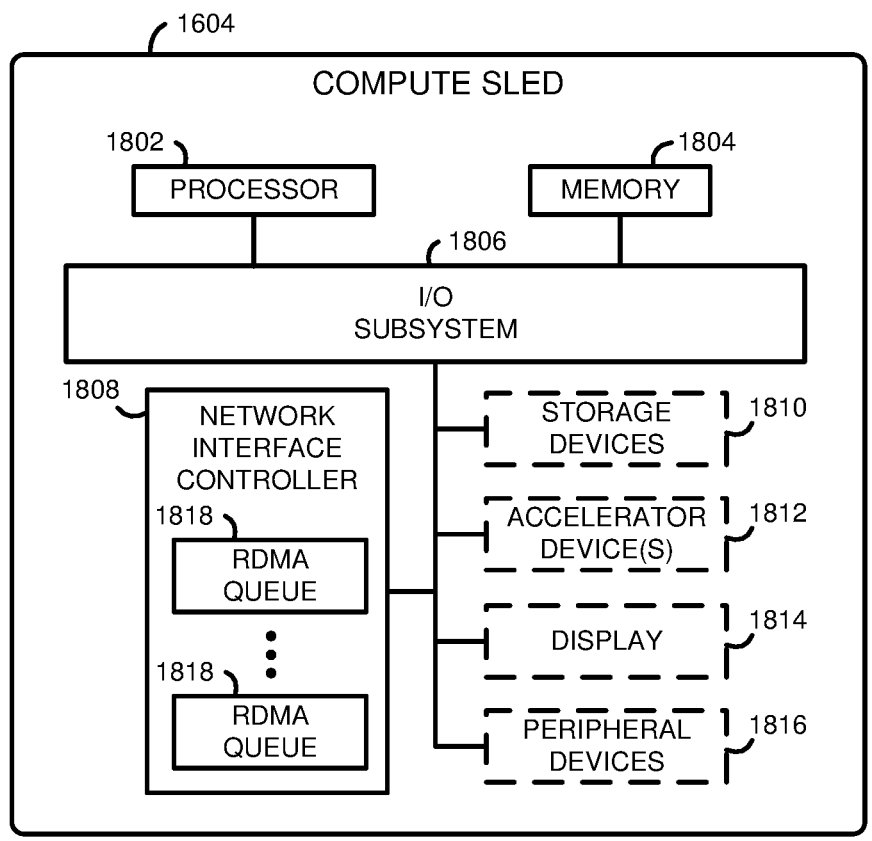
FIG. 18 is a simplified block diagram of a compute sled of the system in FIG. 17.

Referring now to FIG. 18, the compute sled 1604 may be embodied as any hardware capable of performing the function described herein. In the illustrative embodiment, the compute sled 1604 is embodied as a sled in a rack of a data center with several high-performance multi-core processors 1802. Additionally or alternatively, the compute sled 1604 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device.

The storage sled 1606 includes a processor 1802, a memory 1804, an I/O subsystem 1806, and a network interface controller 1808. In some embodiments, the processor 1802, the memory 1804, etc. may be similar to the processor 1702, the memory 1704, etc. of the orchestrator server 1602, the description of which will not be included in the interest of clarity. Of course, it should be appreciated that, in some embodiments, the components of the compute sled 1604 may differ from the orchestrator server 1602 quantitatively or qualitatively. For example, in one embodiment, the orchestrator server 1602 may have processors 1702 that do not have as high of performance as the processors 1802 on the compute sled 1604.

In some embodiments, certain components of the compute sled 1604 may have certain capabilities that were not explicitly discussed in regard to the corresponding component of the orchestrator server 1602. For example, the processor 1802 may have the capability of controlling allocation of resources among various processes, threads, application, virtual machines, containers, etc. In one embodiment, processor 1802 may implement some or all of the Intel® Resource Director Technology (RDT). The processor 1802 may be able to monitor cache usage, allocate cache usage, monitor memory bandwidth, allocate memory bandwidth, etc. to the various processes, threads, applications, virtual machines, containers, etc. Each process, thread, application, virtual machine, container, etc. may be associated with a particular quality of service (QoS) parameter, such as by being assigned to a particular class of service (CoS).

Additionally, the illustrative network interface controller 1808 may have capability that the network interface controller 1710 does not necessarily have. In particular, the network interface controller includes one or more remote direct memory access (RDMA) queues 1818. In the illustrative embodiment, the compute sled 1604 may establish one or more pairs of RDMA queues 1818, each of which may be associated with an RDMA queue pair on a remote device, such as another compute sled 1604, a storage sled 1606, or an accelerator sled 1608. Each pair of RDMA queues 1818 includes a send RMDA queue 1818 and a receive RDMA queue 1818. The network interface controller 1808 is configured to send data or commands placed in the send RDMA queue 1818 to the corresponding receive RMDA queue on the remote device. The network interface controller 1808 is also configured to place packets sent from the corresponding send queue on the remote device in the receive RDMA queue 1818. The network interface controller 1808 may process the receive RDMA queue 1818 by, e.g., writing data to the memory 1804 and/or reading data from the memory 1804 to be placed in the send RDMA queue 1818. The network interface controller 1808 may service the various RDMA queues 1818 using any suitable approach, such as weighted round robin, weighted fair queuing, etc.

In the illustrative embodiment, the network interface controller 1808 is capable of servicing the pairs of RDMA queues 1818 differently based on an associated QoS parameter. For example, each pair of RDMA queue 1818 may be assigned to a different CoS, and the network interface controller 1808 may then service the RDMA queue 1818 with a different bandwidth or weighting based on the assigned class. As a result, the pairs of RDMA queues 1818 may have a different performance based on the associated QoS parameter. A QoS parameter may become associated with a particular pair of RDMA queues 1818 in any suitable manner, such as by execution by the processor 1802 of a suitable operation code or opcode. In one embodiment, the processor 1802 may get and set a QoS parameter of a pair of RDMA queues 181 using an opcode OP_GET_VF_QOS and OP_SET_VF_QOS, respectively.

In the illustrative embodiment, the compute sled 1604 is primarily used for compute services, and other services such as storage services and/or accelerator services may be provided by, e.g., a storage sled 1606 and/or an accelerator sled 1608. However, in some embodiments, the compute sled 1604 may include one or more storage devices 1810, one or more accelerator devices 1812, a display 1814, and/or one or more peripheral devices 1816. Each of the storage devices 1810, display 1814, and peripheral devices 1816 may be similar to the storage devices 1708, display 1712, and peripheral devices 1714 of the orchestrator server 1602, the description of which will not be repeated in the interest of clarity. Each of the accelerator devices 1812 may be any suitable accelerator device, such as a field programmable gate array (FPGA), an application-specific integrated circuit (ASIC), a graphics processing unit (GPU), etc.

Each of the storage sleds 1606 and accelerator sleds 1608 may include some or all of the same components as the compute sled 1604, which will not be repeated in the interest of clarity. Of course, it should be appreciated that, in some embodiments, some of the components of the storage sleds 1606 and/or the accelerator sleds 1608 may different quantitatively or qualitatively from those of the compute sled 1604. For example, in the illustrative embodiment, the storage sleds 1606 may include a relatively low-performance processor(s) and a large amount of high-capacity storage devices. Similarly, the accelerator sleds 1608 may include a relatively low-performance processor(s) and several high-performance accelerator devices, with or without some storage devices.

Figure 19:
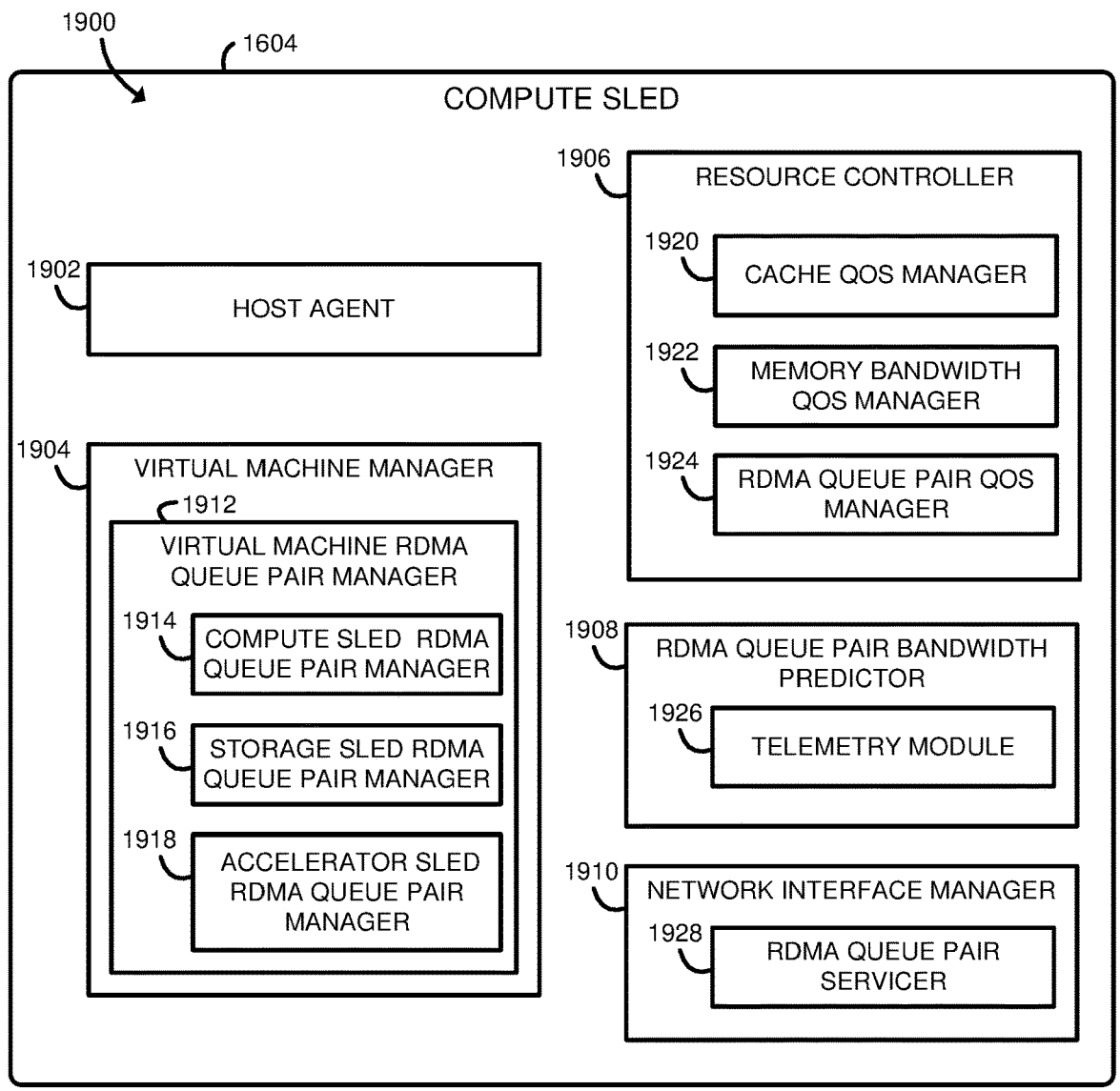
FIG. 19 is a simplified block diagram of an environment that may be established by the compute sled of FIG. 17.

Referring now to FIG. 19, in an illustrative embodiment, the compute sled 1604 establishes an environment 1900 during operation. The illustrative environment 1900 includes a host agent 1902, a virtual machine manager 1904, a resource controller 1906, an RDMA queue pair bandwidth predictor 1908, and a network interface controller 1910. The various modules of the environment 1900 may be embodied as hardware, software, firmware, or a combination thereof. For example, the various modules, logic, and other components of the environment 1900 may form a portion of, or otherwise be established by, the processor 1802 or other hardware components of the compute sled 1604. As such, in some embodiments, one or more of the modules of the environment 1900 may be embodied as circuitry or collection of electrical devices (e.g., a host agent circuit 1902, a virtual machine manager circuit 1904, a resource controller circuit 1906, etc.). It should be appreciated that, in such embodiments, one or more of the circuits (e.g., the host agent circuit 1902, the virtual machine manager circuit 1904, the resource controller circuit 1906, etc.) may form a portion of one or more of the processor 1802, the memory 1804, the I/O subsystem 1806, the network interface controller 1808, the storage devices 1810, and/or other components of the compute sled 1604. Additionally, in some embodiments, one or more of the illustrative modules may form a portion of another module and/or one or more of the illustrative modules may be independent of one another. Further, in some embodiments, one or more of the modules of the environment 1900 may be embodied as virtualized hardware components or emulated architecture, which may be established and maintained by the processor 1802 or other components of the compute sled 1604. It should be appreciated that, in some embodiments, some of the functionality of one or more of the modules of the environment 1900 may require a hardware implementation, in which case embodiments of modules which implement such functionality will be embodied at least partially as hardware.

The host agent 1902, which may be embodied as hardware, firmware, software, virtualized hardware, emulated architecture, and/or a combination thereof as discussed above, is configured to interface with the orchestrator server 1602. The host agent 1902 may allow the orchestrator server 1602 to control the compute sled 1604, such as by controlling what virtual machines are being operated on the compute sled 1604.

The virtual machine manager 1904, which may be embodied as hardware, firmware, software, virtualized hardware, emulated architecture, and/or a combination thereof as discussed above, is configured to manage the virtual machines that may operate on the compute sled 1604. The virtual machine manager may configure, create, manage, terminate, and perform any other suitable control of virtual machines on the compute sled 1604.

The virtual machine manager 1904, which may be embodied as hardware, firmware, software, virtualized hardware, emulated architecture, and/or a combination thereof as discussed above, includes a virtual machine RDMA queue pair manager 1912. Some or all of the virtual machines on the compute sled 1604 may have one or more RDMA queue pairs established in the network interface controller 1808. In the illustrative embodiment, each RDMA queue pair is assigned to a different virtual extensible local area network (VXLAN). Additionally or alternatively, some or all of the RDMA queue pairs may be assigned to the same VXLAN. The virtual machine RDMA queue pair manager 1912 includes a compute sled RDMA queue pair manager 1914, a storage sled RDMA queue pair manager 1916, and an accelerator sled RDMA queue pair manager 1918. The compute sled RDMA queue pair manager 1914 may manage one or more RDMA queue pairs associated with a remote compute sled 1604. The storage sled RDMA queue pair manager 1916 may manage one or more RDMA queue pairs associated with a storage sled 1606. The accelerator sled RDMA queue pair manager 1918 may manage one or more RDMA queue pairs associated with an accelerator sled 1608.

The resource controller 1906, which may be embodied as hardware, firmware, software, virtualized hardware, emulated architecture, and/or a combination thereof as discussed above, is configured to allocate certain resources to processes, threads, applications, virtual machines, containers, etc. of the compute sled 1604. The resource controller includes a cache QoS manager 1920, a memory bandwidth QoS manager 1922, and a RDMA queue pair QoS manager 1924. The cache QoS manager 1920 is configured to monitor cache usage and allocate cache usage on a virtual machine by virtual machine basis. The memory bandwidth QoS manage 1922 is configured to monitor memory bandwidth and allocate memory bandwidth on a virtual machine by virtual machine basis. The RDMA queue pair QoS manager 1924 is configured to allocate bandwidth to each RDMA queue pair of each virtual machine based on one or more QoS parameters, such as a class of service ID or a weighting. In the illustrative embodiment, the QoS parameters may include a minimum and maximum bandwidth to allocate to each RDMA queue pair, and the RDMA queue pair QoS manager 1924 may configure a minimum and a maximum bandwidth for each RDMA queue pair accordingly. The QoS parameters may also include a send queue priority setting, allocation of traffic classes to the virtual machine, and strict priority traffic classes.

The RDMA queue pair bandwidth predictor 1908, which may be embodied as hardware, firmware, software, virtualized hardware, emulated architecture, and/or a combination thereof as discussed above, is configured to predict a bandwidth usage for some or all of the RDMA queue pairs configured in the network interface controller 1808. To do so, the RDMA queue pair bandwidth predictor 1908 includes a telemetry module 1926 to monitor various parameters of the virtual machines such as RDMA flow data. In the illustrative embodiment, the telemetry module 1926 may send telemetry data of an RDMA flow to a remote device such as the orchestrator server 1902, where RDMA flows may be classified as elephant flows or mouse flows, as discussed in more detail below in regard to the environment 2000 of the orchestrator server 1602. The orchestrator server 1902 may then send the classification back to the compute sled 1604, where the RDMA queue pair bandwidth predictor 1908 may use the classification as an input in prediction of future bandwidth usage.

The RDMA queue pair bandwidth predictor 1908 may use any suitable parameter to predict future RDMA queue pair bandwidth, such as flow rate, number of flows, flow types, applications associated with flows, the type of device on the other end of the flow, etc. In one embodiment, if a RDMA flow is identified as an elephant flow, the corresponding RDMA queue pair bandwidth may be predicted to increase, and the bandwidth assigned to that RDMA queue pair may be increased while the elephant flow is ongoing.

The network interface manager 1910 may be embodied as hardware, firmware, software, virtualized hardware, emulated architecture, and/or a combination thereof as discussed above. In the illustrative embodiment, the network interface manager 1910 forms part of the network interface controller 1808. Additionally or alternatively, some or all of the network interface manager 1910 may be part of the processor 1802, the memory 1804, etc. The network interface manager 1910 is configured to manage the network interface controller 1808. The network interface manager 1910 may send and receive data to and from other compute devices. The network interface manager 1910 includes the RDMA queue pair servicer 1928, which processes the RDMA queue pairs. The RDMA queue pair servicer 1928 is configured to send data or commands placed in each send RDMA queue to the corresponding receive RMDA queue on a remote device. The RDMA queue pair servicer 1928 is also configured to place packets sent from a send queue on a remote device in the corresponding receive RDMA queue. The RDMA queue pair servicer 1928 may process the receive RDMA queue by, e.g., writing data to the memory 1804 and/or reading data from the memory 1804 to be placed in the corresponding send RDMA queue. In the illustrative embodiment, the RDMA queue pair servicer 1928 may service the various RDMA queues using a weighted round robin approach, where the weighting is determined by a QoS parameter for each RDMA queue pair. Additionally or alternatively, other approaches may be used, such as using weighted fair queuing or applying an amount of bandwidth determined by a QoS parameter for each RDMA queue pair.

Figure 20:
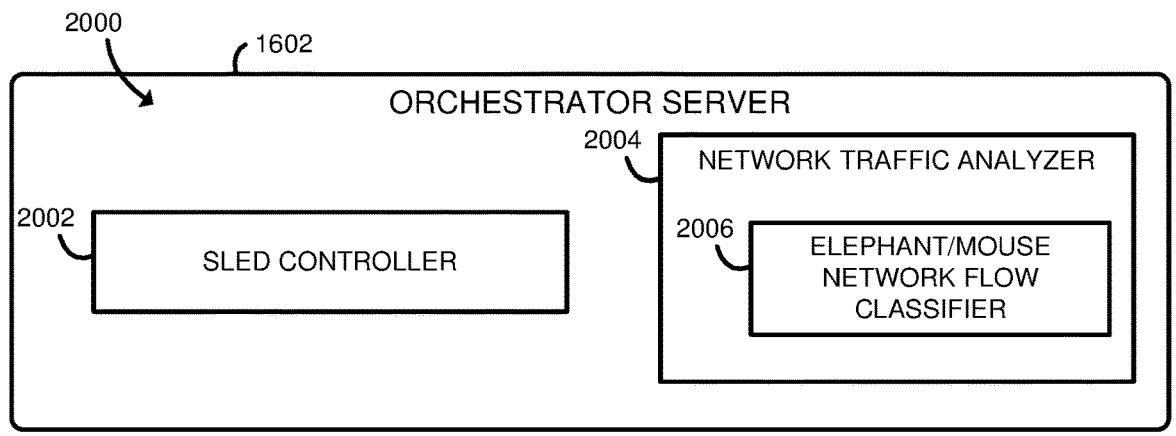
FIG. 20 is a simplified block diagram of an environment that may be established by the orchestrator server of FIG. 17.

Referring now to FIG. 20, in an illustrative embodiment, the orchestrator server 1602 establishes an environment 2000 during operation. The illustrative environment 2000 includes a sled controller 2002 and a network traffic analyzer 2004. The various modules of the environment 2000 may be embodied as hardware, software, firmware, or a combination thereof. For example, the various modules, logic, and other components of the environment 2000 may form a portion of, or otherwise be established by, the processor 1702 or other hardware components of the orchestrator server 1602. As such, in some embodiments, one or more of the modules of the environment 2000 may be embodied as circuitry or collection of electrical devices (e.g., a sled controller circuit 2002, a network traffic analyzer circuit 2004, etc.). It should be appreciated that, in such embodiments, one or more of the circuits (e.g., the sled controller circuit 2002, the network traffic analyzer circuit 2004, etc.) may form a portion of one or more of the processor 1702, the memory 1704, the I/O subsystem 1706, the storage devices 1708, the network interface controller 1710, and/or other components of the orchestrator server 1602. Additionally, in some embodiments, one or more of the illustrative modules may form a portion of another module and/or one or more of the illustrative modules may be independent of one another. Further, in some embodiments, one or more of the modules of the environment 2000 may be embodied as virtualized hardware components or emulated architecture, which may be established and maintained by the processor 1702 or other components of the orchestrator server 1602. It should be appreciated that, in some embodiments, some of the functionality of one or more of the modules of the environment 2000 may require a hardware implementation, in which case embodiments of modules which implement such functionality will be embodied at least partially as hardware.

The sled controller 2002, which may be embodied as hardware, firmware, software, virtualized hardware, emulated architecture, and/or a combination thereof as discussed above, is configured to control the various compute sleds 1604, storage sleds 1606, and accelerator sleds 1808 of the system 1600. The sled controller 2002 may compose nodes, configure virtual machines, etc. Of course, in some embodiments, the sled controller 2002 may perform additional functionality that is not described in detail in the interest of clarity.

The network traffic analyzer 2004, which may be embodied as hardware, firmware, software, virtualized hardware, emulated architecture, and/or a combination thereof as discussed above, is configured to analyze network traffic of the system 1600. In particular, in the illustrative embodiment, the network traffic analyzer 2004 will receive telemetry data of an RDMA flow from one or more sleds such as a compute sled 1604 that indicates various information about an RDMA flow, such as overall size and type of traffic. The network traffic analyzer 2004 may analyze the telemetry data of the RDMA flow and may send the result of analysis back to the sled associated with the RDMA flow.

The network traffic analyzer 2004 includes an elephant/mouse network flow classifier 2006, which is configured to classify an RDMA flow as either an elephant flow or a mouse flow. In the illustrative embodiment the elephant/mouse network flow classifier 2006 may analyze an amount of traffic in a certain amount of time, and, if a flow has an amount of traffic over a certain threshold, the RDMA flow may be classified as an elephant flow. The amount of time over which the traffic amount is evaluated may be any suitable time, such as 100, 200, or 500 milliseconds or 1, 2, 5, or 10 seconds. The threshold amount of traffic that triggers an RDMA flow to be classified as an elephant flow may be any suitable value, such as 1, 2, 5, 10, 50, 100, 500, or 1,000 KB. When an RDMA flow is classified as an elephant or mouse flow, that classification may be sent back to the compute sled 1604 associated with the RDMA flow.

Figure 21:
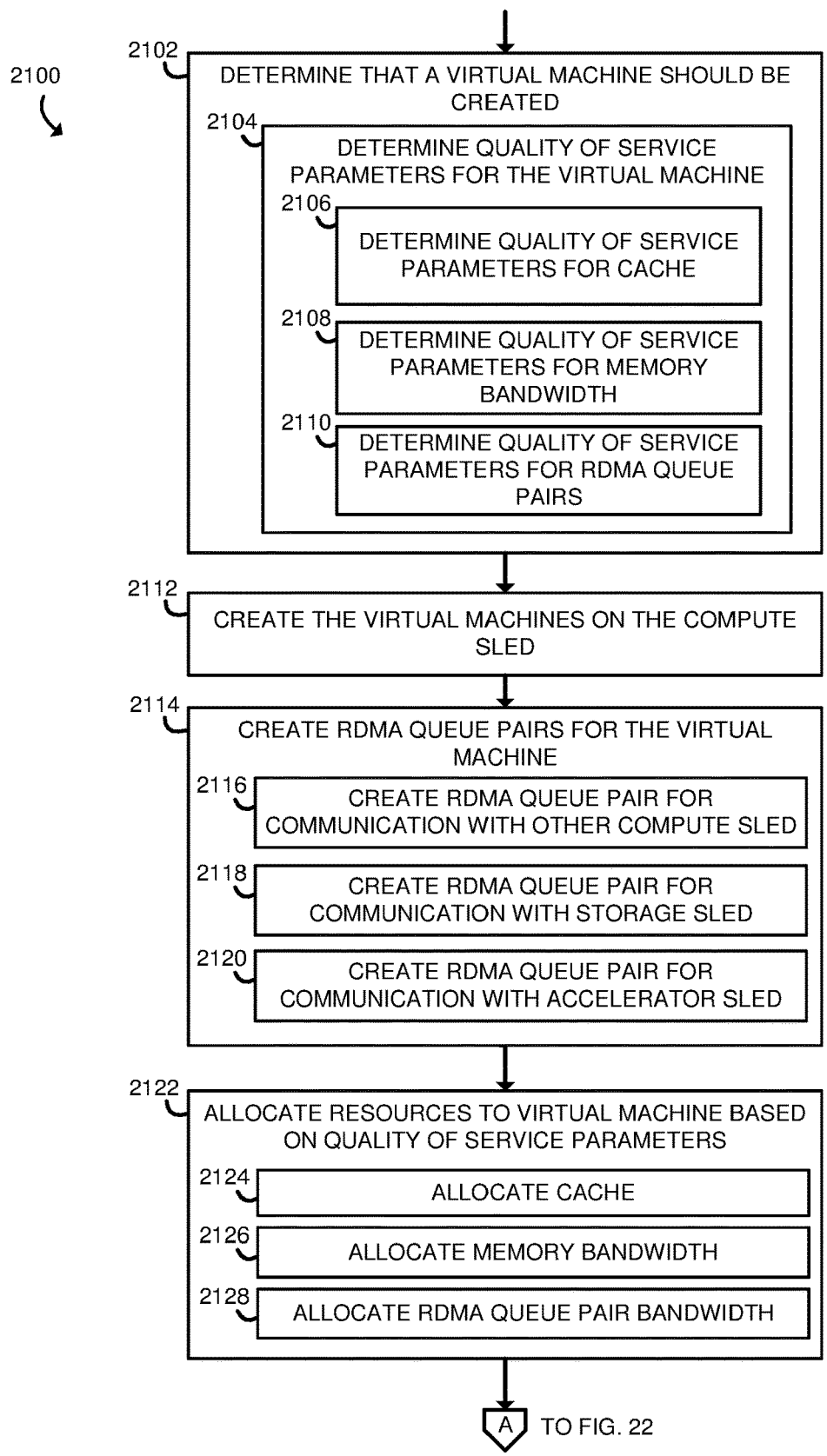
FIGS. 21-22 are a simplified flow diagram of at least one embodiment of a method for managing RDMA queue pair QoS.

Referring now to FIG. 21, in use, the compute sled 1604 may execute a method 2100 for managing RDMA queue pair QoS. The method 2100 begins in block 2102, in which the compute sled 1604 determines that a virtual machine should be created. The compute sled 1604 may determine that a virtual machine should be created by, e.g., receiving a command from a user or from an orchestrator sled 1602. The compute sled 1604 may determine one or more quality of service parameters for the virtual machine. The compute sled 1604 may determine QoS parameters for cache monitoring and usage in block 2106, may determine QoS parameters for memory bandwidth monitoring and usage in block 2108, and may determine QoS parameters for one or more RDMA queue pairs in block 2110. The QoS parameters for the RDMA queue pairs may be embodied as, e.g., a class of service ID, a weighting factor to associate with the RDMA queue pair, a bandwidth to allocate to the RDMA queue pair, etc. In some embodiments, the QoS parameters may indicate a minimum and a maximum bandwidth to be allocated to each RDMA queue pair. It should be appreciated that different QoS parameters may be associated with different RDMA queue pairs for the same virtual machine. The various QoS parameters may be determined in any suitable way, such as being given QoS parameters to use from the orchestrator server 1602, which may stores the QoS parameters to use for various virtual machines in a table.

In block 2112, the compute sled 1604 creates the virtual machines on the compute sled 1604. It should be appreciated that, in come embodiments, the virtual machine may include various resources on other sleds, such as storage resources on a storage sled 1606 and/or accelerator resources on an accelerator sled 1608.

In block 2114, the compute sled 1604 creates one or more RDMA queue pairs for the virtual machine. The compute sled 1604 may create RDMA queue pairs for communication with other compute sleds 1604 in block 2116. In the illustrative embodiment, each RDMA queue pair is assigned to a different VXLAN. Additionally or alternatively, some or all of the RDMA queue pairs may be assigned to the same VXLAN. The compute sled 1604 may create RDMA queue pairs for communication with storage sleds 1606 in block 2118. The compute sled 1604 may create RDMA queue pairs for communication with accelerator sleds 1608 in block 2120. The compute sled 1604 may communicate with remote devices such as storage sleds 1606, accelerator sleds 1608, or other compute sleds 1604 to coordinate creation of corresponding RDMA queue pairs on the remote devices.

In block 2122, the compute sled 1604 allocates resources to the virtual machine based on the QoS parameters. The compute sled 1604 may allocate cache of the processor 1802 in block 2124. The compute sled 1604 may memory bandwidth in block 2126. The compute sled 1604 may allocate RDMA queue pair bandwidth in block 2128. It should be appreciated that the various RDMA queue pairs of the virtual machine may have different bandwidth allocated to them. The RDMA queue pair bandwidth may be allocated in any suitable manner, such as by assigning the RDMA queue pairs to a class of service or by associating a weighting to be used in a weighted round robin. In the illustrative embodiment, the compute sled 1604 may allocate RDMA queue pair bandwidth to an RDMA queue pair on the network interface controller 1808 by executing a special opcode on the processor 1802 that configures the network interface controller 1808 accordingly.

Figure 22:
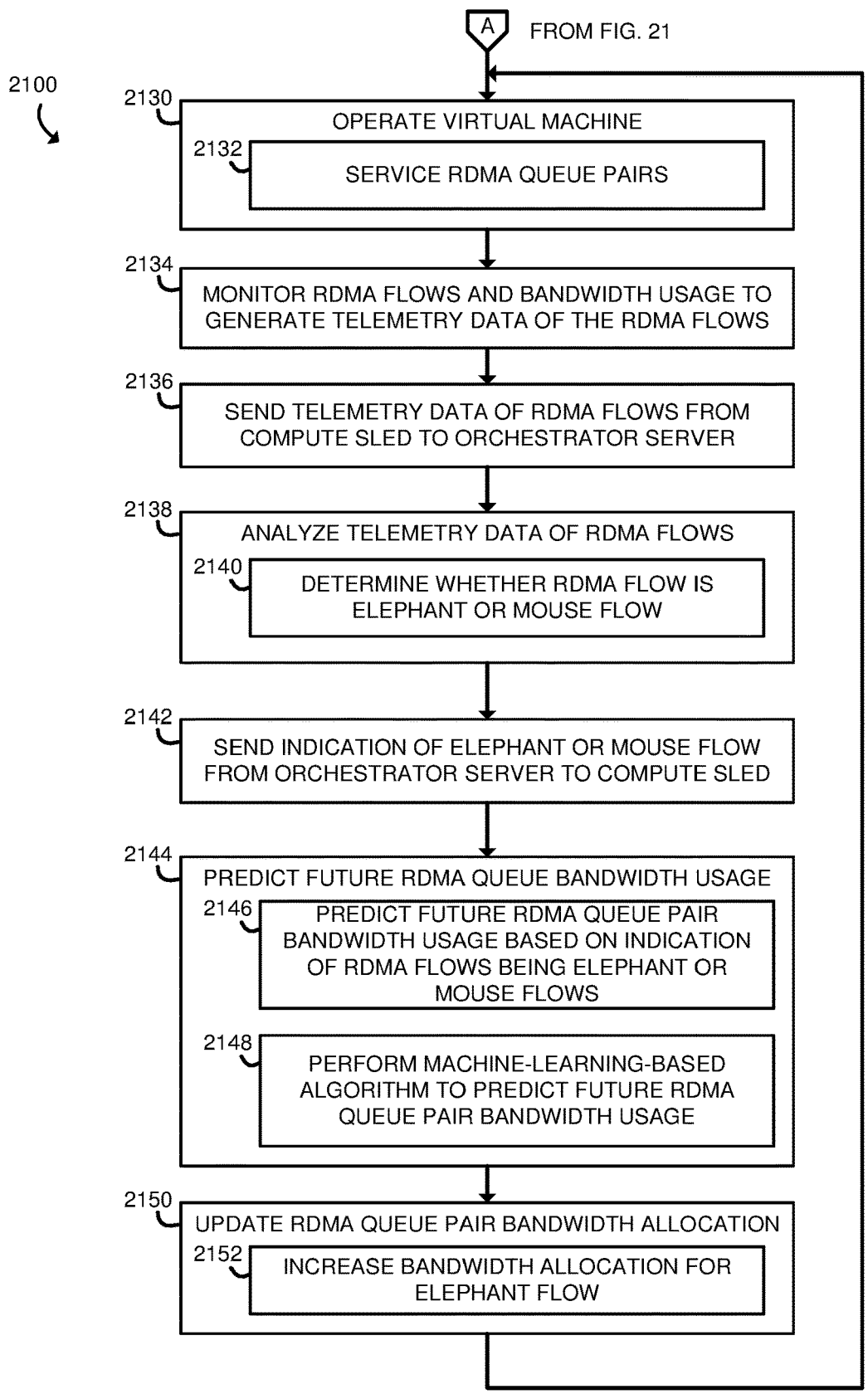

Referring now to FIG. 22, in block 2130, the compute sled 1604 operates the virtual machine. In block 2132, the compute sled 1604 services the various RDMA queue pairs. The compute sled 1604 is configured to send data or commands placed in each send RDMA queue to the corresponding receive RDMA queue on a remote device. The compute sled 1604 is also configured to place packets sent from a send queue on a remote device in the corresponding receive RDMA queue. The compute sled 1604 may process the receive RDMA queue by, e.g., writing data to the memory 1804 and/or reading data from the memory 1804 to be placed in the corresponding send RDMA queue. In the illustrative embodiment, the compute sled 1604 may service the various RDMA queues using a weighted round robin approach, where the weighting is determined by a QoS parameter for each RDMA queue pair. Additionally or alternatively, other approaches may be used, such as using weighted fair queuing or applying an amount of bandwidth determined by a QoS parameter for each RDMA queue pair.

In block 2134, the compute sled 1604 monitors the RDMA flows and associated bandwidth usage to generate telemetry data of the RDMA flows. The compute sled 1604 may monitor various parameters such as flow rate, number of flows, flow types, applications associated with flows, the type of device on the other end of the flow, etc. In block 2136, in the illustrative embodiment, the compute sled sends the telemetry data of the RDMA flow from the compute sled 1604 to the orchestrator server 1602.

In block 2138, in the illustrative embodiment, the compute sled 1604 and/or the orchestrator server 1602 analyzes the telemetry data of the RDMA flows. In the illustrative embodiment, the orchestrator server 1602 determines whether each RDMA flow is an elephant flow or a mouse flow. The orchestrator server 1602 may analyze an amount of traffic in a certain amount of time, and, if a flow has an amount of traffic over a certain threshold, the RDMA flow may be classified as an elephant flow. The amount of time over which the traffic amount is evaluated may be any suitable time, such as 100, 200, or 500 milliseconds or 1, 2, 5, or 10 seconds. The threshold amount of traffic that triggers an RDMA flow to be classified as an elephant flow may be any suitable value, such as 1, 2, 5, 10, 50, 100, 500, or 1,000 KB.

In block 2142, the orchestrator server 2102 sends an indication of whether the RDMA flow is an elephant or mouse flow to the compute sled 1604. It should be appreciated that, in some embodiments, the analysis of whether the RDMA flow is an elephant or mouse flow may be done by the compute sled 1604 without necessarily involving the orchestrator server 1602.

In block 2144, the compute sled 1604 predicts the future RDMA queue pair bandwidth usage. The compute sled 1604 may do any suitable analysis to predict future RDMA queue pair bandwidth usage. In block 2146, the compute sled 1604 may predict future RDMA queue pair bandwidth usage based on the indication of whether an RDMA flow is an elephant flow or a mouse flow. If an RDMA flow is marked as an elephant flow, in some embodiments, the compute sled 1604 may predict that future bandwidth for the corresponding RDMA queue pair will increase. In block 2148, the compute sled 1604 may perform a machine-learning-based algorithm to predict future RDMA queue pair bandwidth usage. Any suitable parameter may be provided as an input to the machine-learning based algorithm, such as flow rate, number of flows, flow types, applications associated with flows, the type of device on the other end of the flow, etc.

In block 2150, the compute sled 1604 may update the RDMA queue pair bandwidth allocation based on the predicted future RDMA queue pair bandwidth. For example, if the bandwidth used by a first RDMA queue pair is expected to increase while the bandwidth used by second RDMA queue pair is expected to decrease, some of the bandwidth from the second RDMA queue pair may be reallocated to the first RDMA queue pair. In block 2152, the compute sled 1604 may increase the bandwidth allocation for an RDMA queue pair associated with an elephant flow. The method 2100 may then loop back to block 2130 to continue operating the virtual machine and servicing RDMA queue pairs.

EXAMPLES

Illustrative examples of the devices, systems, and methods disclosed herein are provided below. An embodiment of the devices, systems, and methods may include any one or more, and any combination of, the examples described below.

Example 1 includes a compute sled for queue pair management comprising virtual machine manager circuitry to create a virtual machine to operate on the compute sled; and create each of a plurality of remote direct memory access (RDMA) queue pairs for the virtual machine; and resource controller circuitry to assign a different quality of service (QoS) parameter to each of the plurality of RDMA queue pairs for the virtual machine; and allocate bandwidth to each of the plurality of RDMA queue pairs for the virtual machine based on the corresponding QoS parameter.

Example 2 includes the subject matter of Example 1, and wherein the plurality of RDMA queue pairs comprises a first RDMA queue pair associated with a remote compute sled, a second RDMA queue pair associated with a storage sled, and a third RDMA queue pair associated with an accelerator sled, wherein the first RDMA queue pair, the second RDMA queue pair, and the third RDMA queue pair are all allocated different bandwidth.

Example 3 includes the subject matter of any of Examples 1 and 2, and wherein the virtual machine manager circuitry is further to assign each of the plurality of RDMA queue pairs to a different virtual extensible local area network (VXLAN).

Example 4 includes the subject matter of any of Examples 1-3, and wherein to allocate bandwidth to each of the plurality of RDMA queue pairs comprises to assign a weighting to each of the plurality of RDMA queue pairs, wherein the compute sled further comprises a network interface controller to service the plurality of RDMA queue pairs with use of a weighted round robin algorithm and the weighting assigned to each of the plurality of RDMA queue pairs.

Example 5 includes the subject matter of any of Examples 1-4, and further including RDMA queue pair bandwidth predictor circuitry to predict a future bandwidth of one or more of the plurality of RDMA queue pairs; and update, based on the prediction of the future bandwidth of the one or more of the plurality of RDMA queue pairs, bandwidth allocation to the one or more of the plurality of RDMA queue pairs.

Example 6 includes the subject matter of any of Examples 1-5, and wherein to predict the future bandwidth of the one or more of the plurality of RDMA queue pairs comprises to predict the future bandwidth of the one or more of the plurality of RDMA queue pairs based on a classification of at least one flow associated with the one or more of the plurality of RDMA queue pairs as an elephant flow or a mouse flow.

Example 7 includes the subject matter of any of Examples 1-6, and wherein the RDMA queue pair bandwidth predictor circuitry is further to generate telemetry data associated with a flow of the plurality of RDMA queue pairs; send the telemetry data to an orchestrator server; and receive, from the orchestrator server, an indication of whether the flow is an elephant or mouse flow, wherein to predict the future bandwidth of the one or more of the plurality of RDMA queue pairs comprises to predict the future bandwidth of the one or more of the plurality of RDMA queue pairs based on the indication of whether the flow is an elephant or mouse flow.

Example 8 includes the subject matter of any of Examples 1-7, and wherein to allocate the bandwidth to each of the plurality of RDMA queue pairs for the virtual machine based on the corresponding QoS parameter comprises to allocate the bandwidth to each of the plurality of RDMA queue pairs for the virtual machine based on the corresponding QoS parameter with use of an operational code that configures a network interface controller of the compute sled to allocate the bandwidth to each of the plurality of RDMA queue pairs.

Example 9 includes the subject matter of any of Examples 1-8, and wherein the virtual machine manager circuitry is further to assign each of the plurality of RDMA queue pairs a minimum bandwidth and a maximum bandwidth.

Example 10 includes a method for queue pair management comprising creating, by a compute sled, a virtual machine to operate on the compute sled; creating, by the compute sled, each of a plurality of remote direct memory access (RDMA) queue pairs for the virtual machine; assigning, by the compute sled, a different quality of service (QoS) parameter to each of the plurality of RDMA queue pairs for the virtual machine; and allocating, by the compute sled, bandwidth to each of the plurality of RDMA queue pairs for the virtual machine based on the corresponding QoS parameter.

Example 11 includes the subject matter of Example 10, and wherein the plurality of RDMA queue pairs comprises a first RDMA queue pair associated with a remote compute sled, a second RDMA queue pair associated with a storage sled, and a third RDMA queue pair associated with an accelerator sled, wherein the first RDMA queue pair, the second RDMA queue pair, and the third RDMA queue pair are all allocated different bandwidth.

Example 12 includes the subject matter of any of Examples 10 and 11, and further including assigning, by the compute sled, each of the plurality of RDMA queue pairs to a different virtual extensible local area network (VXLAN).

Example 13 includes the subject matter of any of Examples 10-12, and wherein allocating bandwidth to each of the plurality of RDMA queue pairs comprises assigning a weighting to each of the plurality of RDMA queue pairs, the method further comprising servicing, by a network interface controller of the compute sled, the plurality of RDMA queue pairs with use of a weighted round robin algorithm and the weighting assigned to each of the plurality of RDMA queue pairs.

Example 14 includes the subject matter of any of Examples 10-13, and further including predicting, by the compute sled, a future bandwidth of one or more of the plurality of RDMA queue pairs; and updating, by the compute sled and based on the prediction of the future bandwidth of the one or more of the plurality of RDMA queue pairs, bandwidth allocation to the one or more of the plurality of RDMA queue pairs.

Example 15 includes the subject matter of any of Examples 10-14, and wherein predicting, by the compute sled, the future bandwidth of the one or more of the plurality of RDMA queue pairs comprises predicting, by the compute sled, the future bandwidth of the one or more of the plurality of RDMA queue pairs based on a classification of at least one flow associated with the one or more of the plurality of RDMA queue pairs as an elephant flow or a mouse flow.

Example 16 includes the subject matter of any of Examples 10-15, and further including generating, by the compute sled, telemetry data associated with a flow of the plurality of RDMA queue pairs; sending, by the compute sled, the telemetry data to an orchestrator server; and receiving, by the compute sled and from the orchestrator server, an indication of whether the flow is an elephant or mouse flow, wherein predicting, by the compute sled, the future bandwidth of the one or more of the plurality of RDMA queue pairs comprises predicting, by the compute sled, the future bandwidth of the one or more of the plurality of RDMA queue pairs based on the indication of whether the flow is an elephant or mouse flow.

Example 17 includes the subject matter of any of Examples 10-16, and wherein allocating, by the compute sled, the bandwidth to each of the plurality of RDMA queue pairs for the virtual machine based on the corresponding QoS parameter comprises allocating, by the compute sled, the bandwidth to each of the plurality of RDMA queue pairs for the virtual machine based on the corresponding QoS parameter with use of an operational code that configures a network interface controller of the compute sled to allocate the bandwidth to each of the plurality of RDMA queue pairs.

Example 18 includes the subject matter of any of Examples 10-17, and further including assigning, by the compute sled, each of the plurality of RDMA queue pairs a minimum bandwidth and a maximum bandwidth.

Example 19 includes one or more computer-readable media comprising a plurality of instructions stored thereon that, when executed, causes a compute sled to perform the method of any of Examples 10-18.

Example 20 includes a compute sled comprising means to perform the method of any of Examples 10-18.

Example 21 includes a compute sled for queue pair management comprising means for creating, by a compute sled, a virtual machine to operate on the compute sled; means for creating each of a plurality of remote direct memory access (RDMA) queue pairs for the virtual machine; means for assigning a different quality of service (QoS) parameter to each of the plurality of RDMA queue pairs for the virtual machine; and means for allocating bandwidth to each of the plurality of RDMA queue pairs for the virtual machine based on the corresponding QoS parameter.

Example 22 includes the subject matter of Example 21, and wherein the plurality of RDMA queue pairs comprises a first RDMA queue pair associated with a remote compute sled, a second RDMA queue pair associated with a storage sled, and a third RDMA queue pair associated with an accelerator sled, wherein the first RDMA queue pair, the second RDMA queue pair, and the third RDMA queue pair are all allocated different bandwidth.

Example 23 includes the subject matter of any of Examples 21 and 22, and further including means for assigning each of the plurality of RDMA queue pairs to a different virtual extensible local area network (VXLAN).

Example 24 includes the subject matter of any of Examples 21-23, and wherein the means for allocating bandwidth to each of the plurality of RDMA queue pairs comprises means for assigning a weighting to each of the plurality of RDMA queue pairs, the method further comprising means for servicing, by a network interface controller of the compute sled, the plurality of RDMA queue pairs with use of a weighted round robin algorithm and the weighting assigned to each of the plurality of RDMA queue pairs.

Example 25 includes the subject matter of any of Examples 21-24, and further including means for predicting a future bandwidth of one or more of the plurality of RDMA queue pairs; and means for updating, based on the prediction of the future bandwidth of the one or more of the plurality of RDMA queue pairs, bandwidth allocation to the one or more of the plurality of RDMA queue pairs.

Example 26 includes the subject matter of any of Examples 21-25, and wherein the means for predicting the future bandwidth of the one or more of the plurality of RDMA queue pairs comprises means for predicting the future bandwidth of the one or more of the plurality of RDMA queue pairs based on a classification of at least one flow associated with the one or more of the plurality of RDMA queue pairs as an elephant flow or a mouse flow.

Example 27 includes the subject matter of any of Examples 21-26, and further including means for generating telemetry data associated with a flow of the plurality of RDMA queue pairs; means for sending the telemetry data to an orchestrator server; and means for receiving, from the orchestrator server, an indication of whether the flow is an elephant or mouse flow, wherein the means for predicting the future bandwidth of the one or more of the plurality of RDMA queue pairs comprises means for predicting the future bandwidth of the one or more of the plurality of RDMA queue pairs based on the indication of whether the flow is an elephant or mouse flow.

Example 28 includes the subject matter of any of Examples 21-27, and wherein the means for allocating the bandwidth to each of the plurality of RDMA queue pairs for the virtual machine based on the corresponding QoS parameter comprises means for allocating the bandwidth to each of the plurality of RDMA queue pairs for the virtual machine based on the corresponding QoS parameter with use of an operational code that configures a network interface controller of the compute sled to allocate the bandwidth to each of the plurality of RDMA queue pairs.

Example 29 includes the subject matter of any of Examples 21-28, and further including means for assigning each of the plurality of RDMA queue pairs a minimum bandwidth and a maximum bandwidth.

The invention claimed is:

1. An apparatus comprising:
    circuitry capable to:
        assign a different quality of service (QoS) parameter to each of a plurality of remote direct memory access (RDMA) queue pairs created for a virtual machine, the virtual machine to operate on a compute device, the plurality of RDMA queue pairs to include a first RDMA queue pair associated with a remote compute device, a second RDMA queue pair associated with a storage device, and a third RDMA queue pair associated with a hardware accelerator device;
        allocate bandwidth to each of the plurality of RDMA queue pairs for the virtual machine based on the corresponding assigned QoS parameter, wherein the first RDMA queue pair, the second RDMA queue pair, and the third RDMA queue pair are allocated different bandwidth;
        monitor telemetry data associated with at least one flow through the plurality of RDMA queue pairs; and
        update bandwidth allocation to one or more of the plurality of RDMA queue pairs based on the monitored telemetry data indicating whether the flow is an elephant flow or a mouse flow.

2. The apparatus of claim 1, wherein the circuitry is further to assign each of the plurality of RDMA queue pairs to a different virtual extensible local area network (VXLAN).

3. The apparatus of claim 1, wherein to allocate bandwidth to each of the plurality of RDMA queue pairs comprise the circuitry to assign a weighting to each of the plurality of RDMA queue pairs,
    wherein a network interface controller of the compute device is to service the plurality of RDMA queue pairs via use of a weighted round robin algorithm that includes the assigned weighting to each of the plurality of RDMA queue pairs as an input to the weighted round robin algorithm.

4. The apparatus of claim 1, further comprising the circuitry capable to:
    estimate a future bandwidth of one or more of the plurality of RDMA queue pairs; and
    update, based on the estimation of the future bandwidth of the one or more of the plurality of RDMA queue pairs, bandwidth allocation to the one or more of the plurality of RDMA queue pairs.

5. The apparatus of claim 4, wherein to estimate the future bandwidth of the one or more of the plurality of RDMA queue pairs comprises to estimate the future bandwidth of the one or more of the plurality of RDMA queue pairs based on a classification of the at least one flow through the plurality of RDMA queue pairs as an elephant flow or a mouse flow.

6. The apparatus of claim 1, wherein to allocate the bandwidth to each of the plurality of RDMA queue pairs for the virtual machine based on the corresponding assigned QoS parameter comprises to allocate the bandwidth to each of the plurality of RDMA queue pairs for the virtual machine based on the corresponding assigned QoS parameter with use of an operational code that configures a network interface controller of the compute device to allocate the bandwidth to each of the plurality of RDMA queue pairs.

7. The apparatus of claim 1, wherein the circuitry is further capable to assign each of the plurality of RDMA queue pairs a minimum bandwidth and a maximum bandwidth.

8. A method comprising:
assigning, by circuitry of a compute device, a different quality of service (QoS) parameter to each of a plurality of remote direct memory access (RDMA) queue pairs created for a virtual machine, the virtual machine to operate on the compute device, the plurality of RDMA queue pairs to include a first RDMA queue pair associated with a remote compute device, a second RDMA queue pair associated with a storage device, and a third RDMA queue pair associated with a hardware accelerator device;
allocating, by the circuitry of the compute device, bandwidth to each of the plurality of RDMA queue pairs for the virtual machine based on the corresponding assigned QoS parameter;
monitoring telemetry data associated with at least one flow through the plurality of RDMA queue pairs; and
updating bandwidth allocation to the one or more of the plurality of RDMA queue pairs based on the monitored telemetry data indicating whether the flow is an elephant flow or a mouse flow.

9. The method of claim 8, wherein the plurality of RDMA queue pairs comprises a first RDMA queue pair associated with a remote compute device, a second RDMA queue pair associated with a storage device, and a third RDMA queue pair associated with an accelerator device,
wherein the first RDMA queue pair, the second RDMA queue pair, and the third RDMA queue pair are all allocated different bandwidth.

10. The method of claim 8, further comprising assigning, by the circuitry of the compute device, each of the plurality of RDMA queue pairs to a different virtual extensible local area network (VXLAN).

11. The method of claim 8, wherein allocating bandwidth to each of the plurality of RDMA queue pairs comprises assigning a weighting to each of the plurality of RDMA queue pairs, the method further comprising servicing, by a network interface controller of the compute device, the plurality of RDMA queue pairs via use of a weighted round robin algorithm that includes the assigned weighting to each of the plurality of RDMA queue pairs as an input to the weighted round robin algorithm.

12. The method of claim 8, further comprising:
estimating, by the circuitry of the compute device, the future bandwidth of the one or more of the plurality of RDMA queue pairs based on a classification of the at least one flow through the plurality of RDMA queue pairs as an elephant flow or a mouse flow; and
updating, based on the estimation of the future bandwidth on the one or more of the plurality of RDMA queue pairs, bandwidth allocation to the one or more of the plurality of RDMA queue pairs.

13. The method of claim 8, further comprising assigning, by the circuitry of the compute device, each of the plurality of RDMA queue pairs a minimum bandwidth and a maximum bandwidth.

14. One or more non-transitory computer-readable media comprising a plurality of instructions stored thereon that, when executed, causes a system to:
assign a different quality of service (QoS) parameter to each of a plurality of remote direct memory access (RDMA) queue pairs created for a virtual machine, the virtual machine to operate on a compute device, the plurality of RDMA queue pairs to include a first RDMA queue pair associated with a remote compute device, a second RDMA queue pair associated with a storage device, and a third RDMA queue pair associated with a hardware accelerator device;
allocate bandwidth to each of the plurality of RDMA queue pairs for the virtual machine based on the corresponding assigned QoS parameter, wherein the first RDMA queue pair, the second RDMA queue pair, and the third RDMA queue pair are allocated different bandwidth;
monitor telemetry data associated with at least one flow through the plurality of RDMA queue pairs; and
update bandwidth allocation to one or more of the plurality of RDMA queue pairs based on the monitored telemetry data indicating whether the flow is an elephant flow or a mouse flow.

15. The one or more non-transitory computer-readable media of claim 14, wherein the plurality of instructions further causes the compute device to assign each of the plurality of RDMA queue pairs to a different virtual extensible local area network (VXLAN).

16. The one or more non-transitory computer-readable media of claim 14, wherein to allocate bandwidth to each of the plurality of RDMA queue pairs comprises to assign a weighting to each of the plurality of RDMA queue pairs,
wherein the plurality of instructions further causes the system to service the plurality of RDMA queue pairs via use of a weighted round robin algorithm that includes the assigned weighting to each of the plurality of RDMA queue pairs as an input to the weighted round robin algorithm.

17. The one or more non-transitory computer-readable media of claim 14, wherein the plurality of instructions further causes the system to:
estimate a future bandwidth of one or more of the plurality of RDMA queue pairs; and
update, based on the estimation of the future bandwidth of the one or more of the plurality of RDMA queue pairs, bandwidth allocation to the one or more of the plurality of RDMA queue pairs.

18. The one or more non-transitory computer-readable media of claim 17, wherein to estimate the future bandwidth of the one or more of the plurality of RDMA queue pairs comprises to estimate the future bandwidth of the one or more of the plurality of RDMA queue pairs based on a classification of the at least one flow through the plurality of RDMA queue pairs as an elephant flow or a mouse flow.

19. The one or more non-transitory computer-readable media of claim 14, wherein to allocate the bandwidth to each of the plurality of RDMA queue pairs for the virtual machine based on the corresponding assigned QoS parameter comprises to allocate the bandwidth to each of the plurality of RDMA queue pairs for the virtual machine based on the corresponding assigned QoS parameter with use of an operational code that configures a network interface controller of the compute device to allocate the bandwidth to each of the plurality of RDMA queue pairs.

* * * * *